United States Patent
Kim et al.

(10) Patent No.: US 9,733,484 B2
(45) Date of Patent: Aug. 15, 2017

(54) IMAGE DISPLAY APPARATUS

(71) Applicant: Samsung Display Co., Ltd., Yongin, Gyeonggi-Do (KR)

(72) Inventors: Kang-Min Kim, Hwaseong-si (KR); Jeongmin Sung, Suwon-si (KR); Sung Woo Lee, Anyang-si (KR); Seung Jun Jeong, Hwaseong-si (KR); Jinhwan Kim, Suwon-si (KR); Hyeonyong Jang, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 70 days.

(21) Appl. No.: 14/632,854

(22) Filed: Feb. 26, 2015

(65) Prior Publication Data
US 2015/0312562 A1 Oct. 29, 2015

(30) Foreign Application Priority Data
Apr. 29, 2014 (KR) ........................ 10-2014-0051727

(51) Int. Cl.
| | |
|---|---|
| *G02B 27/22* | (2006.01) |
| *G09G 5/10* | (2006.01) |
| *G09G 3/34* | (2006.01) |
| *G09G 3/00* | (2006.01) |
| *G09G 3/36* | (2006.01) |
| *H04N 13/04* | (2006.01) |
| *G09G 3/20* | (2006.01) |

(52) U.S. Cl.
CPC ......... *G02B 27/2214* (2013.01); *G09G 3/003* (2013.01); *G09G 3/20* (2013.01); *G09G 3/3406* (2013.01); *G09G 3/3696* (2013.01); *G09G 5/10* (2013.01); *H04N 13/0404* (2013.01); *H04N 13/0452* (2013.01); *G09G 2300/0426* (2013.01); *G09G 2300/0443* (2013.01); *G09G 2300/0447* (2013.01); *G09G 2310/0264* (2013.01); *G09G 2310/0283* (2013.01); *G09G 2340/14* (2013.01); *G09G 2380/00* (2013.01)

(58) Field of Classification Search
CPC ....................................................... G02B 27/22
See application file for complete search history.

(56) References Cited

U.S. PATENT DOCUMENTS

| | | |
|---|---|---|
| 7,710,535 B2 | 5/2010 | Nomura et al. |
| 7,847,869 B2 | 12/2010 | Nelson et al. |
| | (Continued) | |

FOREIGN PATENT DOCUMENTS

| | | |
|---|---|---|
| JP | 3620145 | 2/2005 |
| JP | 4984875 | 7/2012 |
| | (Continued) | |

*Primary Examiner* — Phu Vu
(74) *Attorney, Agent, or Firm* — Innovation Counsel LLP

(57) ABSTRACT

An image display apparatus includes a display panel that displays an image and a switching panel operated in a two-dimensional mode or three-dimensional mode such that the image is perceived as a two-dimensional mode or three-dimensional image on the display panel. The switching panel includes a plurality of unit devices. Each of the unit devices includes a first zone disposed at one side of a center axis of the unit device and a second zone disposed at the other side of the center axis. Each of the first zone and the second zone includes a plurality of electrodes, respectively. The plurality of electrodes do not overlap the center axis.

15 Claims, 19 Drawing Sheets

(56) References Cited

U.S. PATENT DOCUMENTS

| | | |
|---|---|---|
| 7,936,520 B2 | 5/2011 | Yeh |
| 2010/0309419 A1 | 12/2010 | Oka et al. |
| 2011/0211145 A1 | 9/2011 | Tsuruma et al. |
| 2012/0162550 A1 | 6/2012 | Jeong et al. |
| 2012/0162592 A1* | 6/2012 | Takagi ............... G02B 27/2214 349/139 |
| 2012/0206666 A1 | 8/2012 | Jeong et al. |
| 2012/0300042 A1 | 11/2012 | Yun et al. |
| 2013/0107147 A1 | 5/2013 | Whangbo et al. |
| 2013/0107174 A1 | 5/2013 | Yun et al. |

FOREIGN PATENT DOCUMENTS

| | | |
|---|---|---|
| KR | 10-2009-0006473 | 1/2009 |
| KR | 10-2011-0104701 | 9/2011 |

* cited by examiner

IMAGE DISPLAY APPARATUS

CROSS-REFERENCE TO RELATED APPLICATION

This U.S. non-provisional patent application claims priority under 35 U.S.C. §119 to Korean Patent Application No. 10-2014-0051727, filed on Apr. 29, 2014, the contents of which are hereby incorporated by reference in its entirety.

BACKGROUND

1. Field of Disclosure

The present disclosure relates to an image display apparatus. More particularly, the present disclosure relates to an image display apparatus capable of displaying a three-dimensional image.

2. Description of the Related Art

An auto-stereoscopic display technology applied to a three-dimensional image display apparatus displays a three-dimensional image without a shutter glasses. As the auto-stereoscopic display technology, a parallax barrier scheme and a lenticular lens scheme are widely used.

A three-dimensional image display apparatus employing the parallax barrier scheme includes a parallax barrier, through which vertical lattice-shape openings are formed, disposed in front of a display panel including pixels arranged into a matrix of rows and columns. The parallax barrier separates a right-eye image and a left-eye image with respect to right and left eyes of an observer to generate a binocular disparity in different images.

The three-dimensional image display apparatus employing the lenticular lens scheme includes a lenticular lens sheet having a plurality of semi-cylindrical lenses arranged in a column direction and disposed on the display panel instead of the parallax barrier having the vertical lattice shape.

Meanwhile, a lenticular device, which is switched between two-dimensional mode and three-dimensional mode, includes two substrates, liquid crystals filled between the two substrates, and electrodes disposed on one of the two substrates to allow the liquid crystals to be arranged in the lenticular lens shape. The lenticular device is disposed in front of the display panel and switched between two-dimensional mode and three-dimensional mode in response to voltages applied to the electrodes.

SUMMARY

The present disclosure provides an image display apparatus capable of improving reliability thereof and reducing power consumption therein.

Embodiments of the inventive concept provide an image display apparatus including a display panel that displays an image and a switching panel operated in a two-dimensional mode or three-dimensional mode such that the image is perceived as a two- or three-dimensional image on the display panel.

The switching panel includes a plurality of unit devices. Each of the unit devices includes a first zone disposed at one side of a center axis of the unit device and a second zone disposed at the other side of the center axis. Each of the first zone and the second zone includes a plurality of electrodes. The plurality of electrodes may not overlap the center axis.

According to the above, when the switching panel is driven in a polarity inversion driving manner, a flicker, which is caused by a difference between the positive (+) electric charge amount and the negative (−) electric charge amount is reduced, and a direct current residue is prevented from remaining. Thus, a coupling phenomenon is prevented from occurring in the common voltage when the switching panel is driven in the polarity inversion driving manner, so that the reliability of the switching panel is improved.

In addition, since the electric charges are shared between the zones when the switching panel is driven in the polarity inversion driving manner, the power consumption is reduced.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
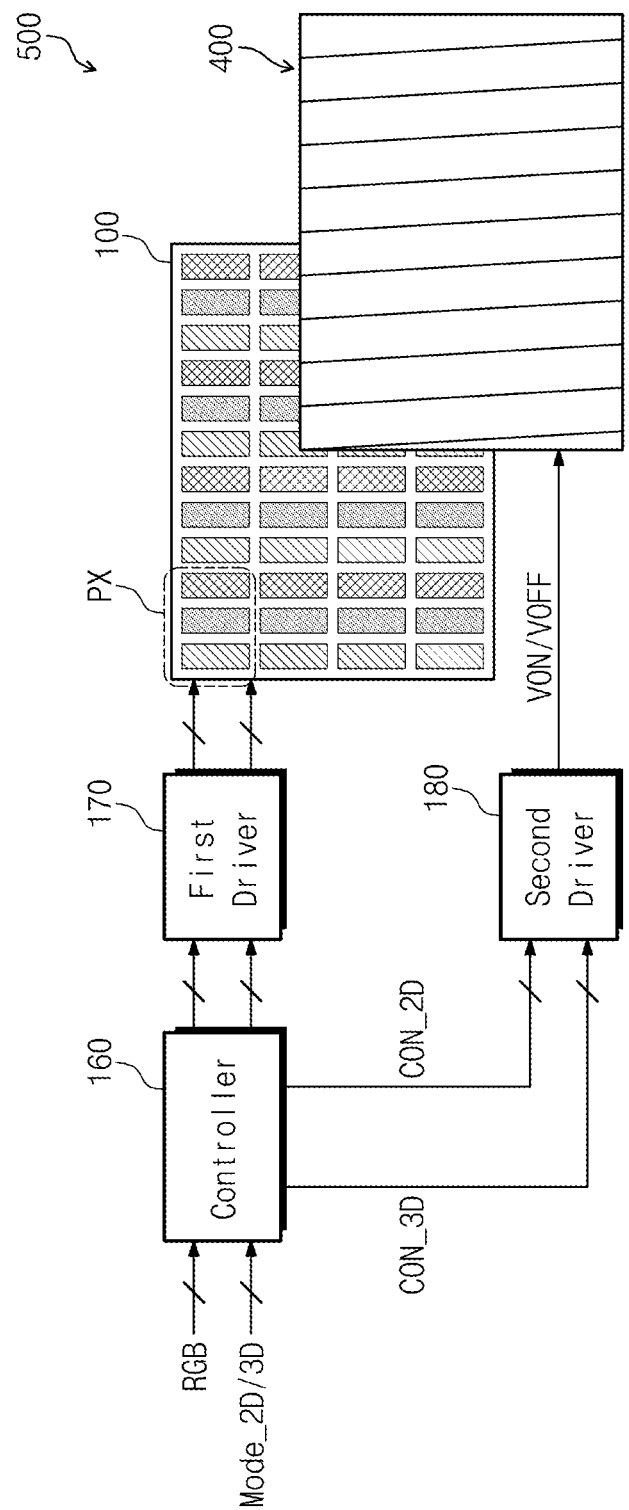
FIG. 1 is a block diagram showing an image display apparatus according to an exemplary embodiment of the present disclosure.

It will be understood that when an element or layer is referred to as being "on", "connected to" or "coupled to" another element or layer, it can be directly on, directly connected to or directly coupled to the other element or layer, or it can be indirectly on, indirectly connected to or indirectly coupled to the other element or layer with intervening elements or layers. In contrast, when an element is referred to as being "directly on," "directly connected to" or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the inventive concept. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the inventive concept will be explained in detail with reference to the accompanying drawings.

FIG. 1 is a block diagram showing an image display apparatus 500 according to an exemplary embodiment of the present disclosure.

Referring to FIG. 1, the image display apparatus 500 includes a controller 160, a first driver 170, a second driver 180, a display panel 300, and a switching panel 400.

The display panel 300 may be a flat display panel such as a liquid crystal display panel, a plasma display panel, and an electroluminescence device (EL) including an organic light emitting diode (OLED).

When the liquid crystal display panel is used as the display panel 300, the image display apparatus 500 includes a backlight unit (not shown) disposed under the display panel 300. Although not shown in FIG. 1, a lower polarizing film is disposed between the display panel 300 and the backlight unit and an upper polarizing film is disposed between the display panel 300 and the switching panel 400. For the convenience of explanation, hereinafter, the liquid crystal display panel will be described as the display panel 300.

Although not shown in FIG. 1, the display panel 300 includes a lower substrate, an upper substrate, and a liquid crystal layer interposed between the lower substrate and the upper substrate. The lower substrate includes a plurality of pixels and the upper substrate includes red, green, and blue color filters disposed thereon to correspond to the pixels in a one-to-one correspondence. The upper polarizing film is attached to the upper substrate and the lower polarizing film is attached to the lower substrate.

The display panel 300 displays a two-dimensional (hereinafter, referred to as 2D) image in response to a control of the controller 160 during a 2D mode and displays a three-dimensional (hereinafter, referred to as 3D) image in response to the control of the controller 160 during a 3D mode.

Although not shown in FIG. 1, the first driver 170 includes a data driving circuit to apply data voltages to data lines of the display panel 300 and a gate driving circuit to sequentially apply gate signals to gate lines of the display panel 300. The data driving circuit converts digital video data, which have a 3D data format and are provided from the controller 160 in the 3D mode, to analog gamma voltages and generates 3D data voltages. In addition, the data driving circuit converts digital video data, which have a 2D data format and provided from the controller 160 in the 2D mode, to analog gamma voltages and generates 2D data voltages.

The controller 160 controls the first driver 170 in response to 2D/3D mode selection signals Mode_2D/Mode_3D provided from a user through a user interface or 2D/3D identification codes extracted from input image signals such that the display panel 300 is operated in the 2D mode or the 3D mode.

The controller 160 generates timing control signals to control an operation timing of the first driver 170 using timing signals, e.g., a vertical synchronization signal, a horizontal synchronization signal, a main clock, a data enable signal, etc. The controller 160 multiplies the timing control signals by integer N to drive the first driver at a frame frequency of about N×60 Hz, i.e., a frequency of about 120 Hz two times greater than an input frame frequency 60 Hz.

The switching panel 400 includes a first substrate, a second substrate, and a liquid crystal layer interposed between the first and second substrates. Each of the first and second substrates may include an insulating material, e.g., glass, plastic, etc. The switching panel 400 may further include a polarizing film (not shown) attached to an outer surface of the switching panel 400.

In addition, the controller 160 applies a first control signal CON_2D, which controls the switching panel 400 to be operated in a disable mode during the 2D mode, and a second control signal CON_3D, which controls the switching panel 400 to be operated in an enable mode during the 3D mode, to the second driver 180.

The second driver 180 generates an on-voltage VON or an off-voltage VOFF in response to the first and second control signals CON_2D and CON_3D and applies the on-voltage and off-voltage VON and VOFF to the switching panel 400. Accordingly, the switching panel 100 receives the off-voltage VOFF from the second driver 180 in the 2D mode, and thus the switching panel 100 is not operated as a Fresnel lens during the 2D mode. On the contrary, the switching panel 400 receives the on-voltage VON from the second driver 180 in the 3D mode, and thus the switching panel 100 is operated as the Fresnel lens during the 3D mode.

Therefore, the switching panel 400 transmits the image displayed in the display panel 100 during the 2D mode without separation in the visual field and separates the visual field of the image displayed in the display panel 100 during the 3D mode.

Figure 2:
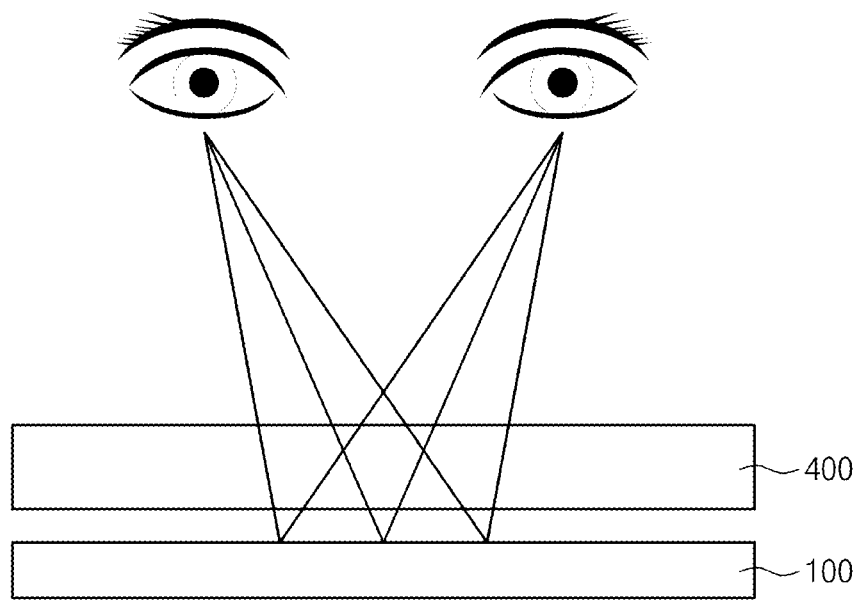
FIGS. 2 and 3 are views showing a method of forming two-dimensional image and three-dimensional image using an image display apparatus according to an exemplary embodiment of the present disclosure.
Figure 3:
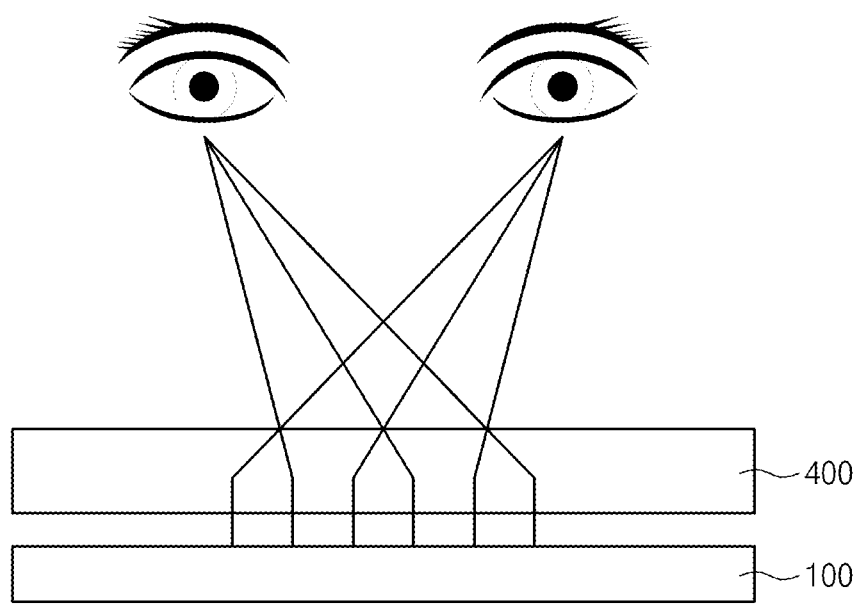

FIGS. 2 and 3 are views showing a method of forming the 2D and 3D images using the image display apparatus according to an exemplary embodiment of the present disclosure.

Referring to FIGS. 2 and 3, the image display apparatus 500 includes the display panel 300 that displays the image and the switching panel 400 disposed in front of the display surface of the display panel 300, on which the image is displayed.

The display panel 300 displays one plane image in the 2D mode, but alternately displays images corresponding to various visual fields, such as a right-eye image, a left-eye image, etc., through spatial-division-multiplexing scheme and time-division-multiplexing scheme in the 3D mode. For instance, the display panel 300 alternately displays the right-eye image and the left-eye image every pixel in one column during the 3D mode.

The switching panel 400 transmits the image displayed in the display panel 300 during the 2D mode without separation in the visual field and separates the visual field of the image displayed in the display panel 300 during the 3D mode. That is, the switching panel 400 operated in the 3D mode may focus the images includes the left-eye image and the right-eye image on a corresponding visual field using refraction and diffraction of the light.

FIG. 2 shows the display panel 300 and the switching panel 400, which are operated in the 2D mode. In this case, the same image is applied to the left and right eyes of the user, and thus the user recognizes the 2D image. FIG. 3 shows the display panel 300 and the switching panel 400, which are operated in the 3D mode. In this case, the switching panel 400 separates the image displayed on the display panel into the left eye image and right eye image, and thus the user recognizes the 3D image.

Figure 4:
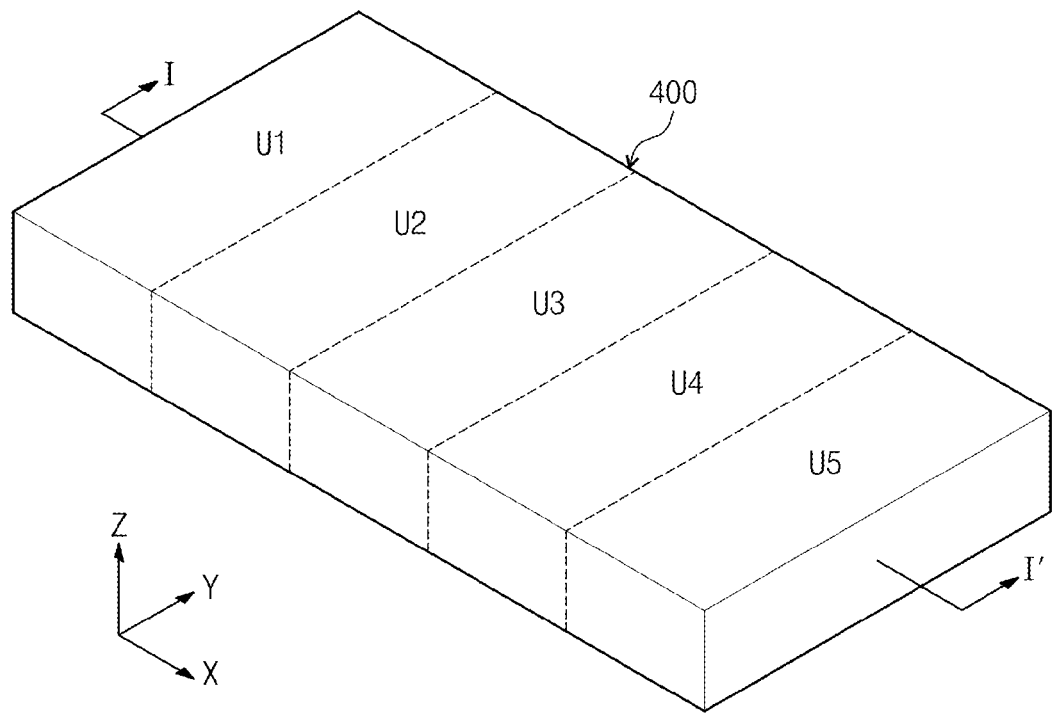
FIG. 4 is a perspective view showing a switching panel of an image display apparatus according to an exemplary embodiment of the present disclosure.
Figure 5:
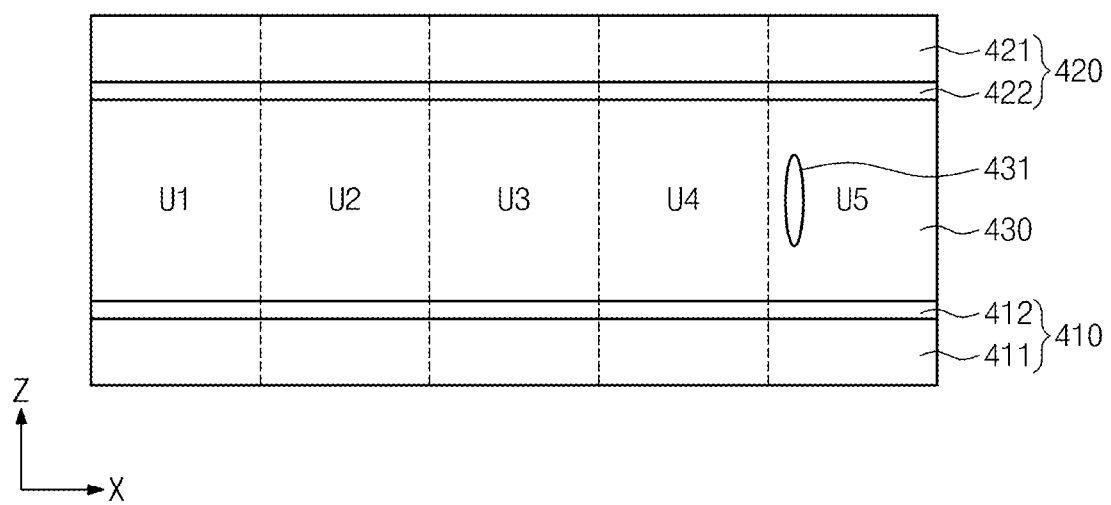
FIG. 5 is a cross-sectional view taken along a line I-I' shown in FIG. 4 to show the switching panel.

FIG. 4 is a perspective view showing the switching panel 400 of the image display apparatus 500 according to an exemplary embodiment of the present disclosure and FIG. 5 is a cross-sectional view taken along a line I-I' shown in FIG. 4 to show the switching panel.

Referring to FIGS. 4 and 5, the switching panel 400 includes a plurality of unit devices U1 to U5 sequentially arranged in an x-axis direction. Each of the unit devices U1 to U5 covers N viewpoints (N is a natural number), and one viewpoint corresponds to one pixel. In the present exemplary embodiment, each of the unit devices U1 to U5 covers nine viewpoints.

The switching panel 400 includes the first substrate 410, the second substrate 420, and the liquid crystal layer 430 interposed between the first and second substrates 410 and 420. The first substrate 410 includes a first base substrate 411 and a first electrode layer 412 disposed on the first base substrate 411 and the second substrate 420 includes a second base substrate 421 and a second electrode layer 422 disposed on the second substrate 421. The first and second electrode layers 412 and 422 include a transparent conductive material, such as indium tin oxide (ITO), indium zinc oxide (IZO), etc.

One of the first and second electrode layers 412 and 422 may be patterned such that plural electrodes are disposed in each of the unit devices U1 to U5 and the other of the first and second electrode layers 412 and 422 may not be patterned. The other of the first and second electrode layers 412 and 422 may be integrally formed as a single unitary and individual unit.

The liquid crystal layer 430 includes negative vertical alignment liquid crystal molecules. The first and second electrode layers 412 and 422 form an electric field in the liquid crystal layer 430 in response to voltages respectively applied to the patterned one of the first and second electrode layers 412 and 422 to control the alignment of the liquid crystal molecules 431 of the liquid crystal layer 430.

The switching panel 400 is operated in the 2D or 3D mode in accordance with the voltages respectively applied to the first and second electrode layers 412 and 422. For instance, when the off-voltage VOFF is applied to the first and second electrode layers 412 and 422, the switching panel 400 is operated in the 2D mode, and when the on-voltage VON is applied to the first and second electrode layers 412 and 422, the switching panel 400 is operated in the 3D mode.

Figure 6:
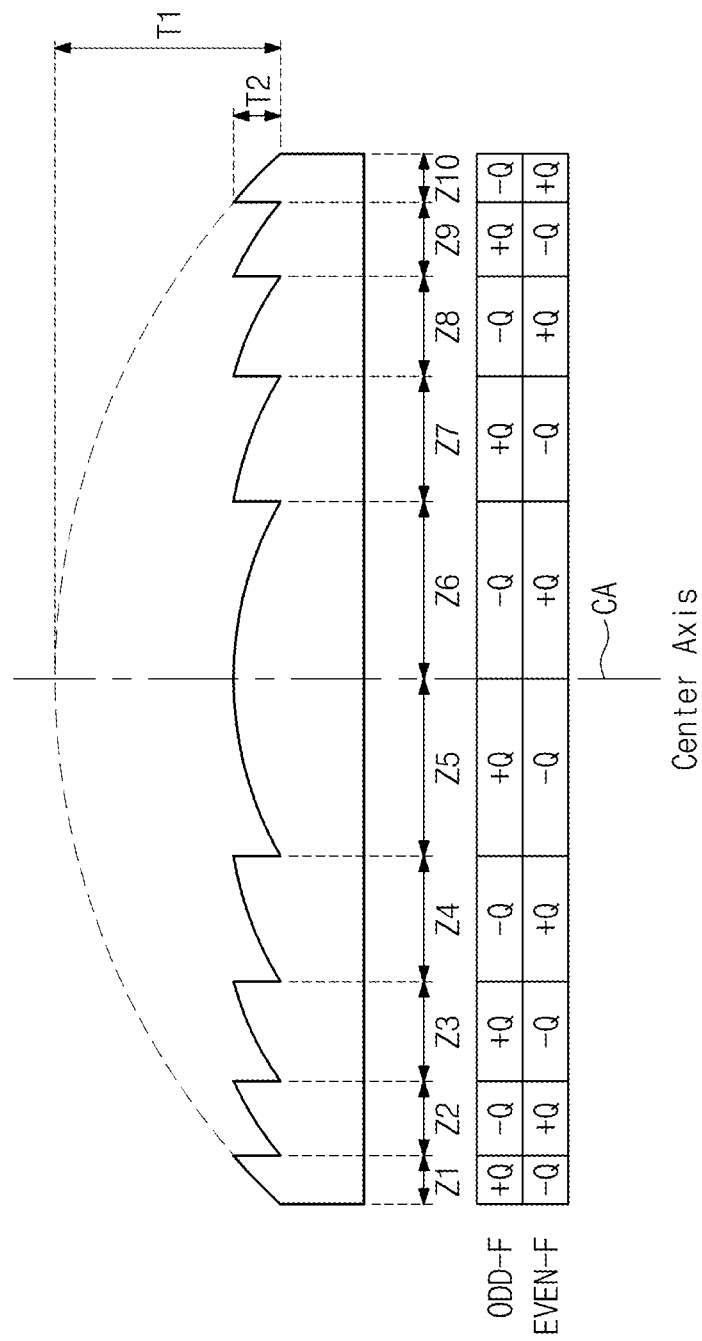
FIG. 6 is a view showing shape and phase retardation of a unit device shown in FIG. 4.

FIG. 6 is a view showing shape and phase retardation of the unit device shown in FIG. 4. In the present exemplary embodiment, since the unit devices U1 to U5 have the same structure and function, only one unit device will be described in detail with reference to FIG. 6 and details of the others will be omitted.

Referring to FIGS. 4 and 6, the switching panel 400 includes the unit devices U1 to U5. The unit devices U1 to U5 are repeatedly arranged in the x-axis direction of the switching panel 400. In the switching panel 400, positions of the unit devices U1 to U5 may be fixed to specific positions or changed in accordance with a lapse of time.

When the switching panel 400 is operated in the 3D mode, the liquid crystal molecules in each unit device U1 to U5 are tilted to have the same phase differences as those of a Fresnel lens. In detail, each of the unit devices U1 to U5 may include a plurality of zones. Each zone of the unit devices U1 to U5 may include a phase retardation surface having the same curvature as the ideal phase retardation surface. Accordingly, when the switching panel 400 is operated in the 3D mode, the phase retardation surface is formed in each zone and discontinuities in phase exist between the zones. For instance, the ideal phase retardation surface may be the surface having a convex lens shape, a spherical lens shape, or a hybrid lens shape.

When the ideal phase retardation surface is the convex lens, each unit device may be the Fresnel lens which has a second thickness T2. The Fresnel lens may be made by taking the phase retardation surface of the convex lens having a first thickness T1 greater than the second thickness T2 to have the second thickness T2. Therefore, when the switching panel 400 is operated such that each unit device U1 to U5 is realized in the shape of the Fresnel lens, a cell gap of the switching panel 400 may be reduced by 1/N compared to that of the switching panel 400 when each unit device U1 to U5 is realized in the shape of the convex lens. Here, when assuming that the number of circular arcs in the shape of the Fresnel lens is "n", "N" is a natural number corresponding to "n/2".

As described above, each of the unit devices U1 to U5 may be divided into the zones, e.g., first to tenth zones Z1, Z2, Z3, Z4, Z5, Z6, Z7, Z8, Z9, and Z10. Among the zones Z1, Z2, Z3, Z4, Z5, Z6, Z7, Z8, Z9, and Z10, the zones disposed at a left side of a center axis CA are referred to as the first to fifth zones Z1, Z2, Z3, Z4, and Z5 and the zones disposed at a right side of the center axis CA are referred to as the sixth to tenth zones Z6, Z7, Z8, Z9, and Z10. In the present exemplary embodiment, each of the first to tenth zones Z1, Z2, Z3, Z4, Z5, Z6, Z7, Z8, Z9, and Z10 may form the same phase retardation surface as the curvature of each of concentric circles, in which a distance is decreased as a distance from the center axis CA is increased.

In addition, a width (hereinafter, referred to as a pitch) of the first to fifth zones Z1 to Z5 is increased as the distance from the center axis CA is decreased. A pitch of the sixth to tenth zones Z6 to Z10 is increased as the distance from the center axis CA is decreased.

As an example, FIG. 6 shows five right-side zones and five left-side zones, which are disposed at the right and left sides of the center axis CA, but the number of the zones should not be limited thereto or thereby.

Each of the first to tenth zones Z1, Z2, Z3, Z4, Z5, Z6, Z7, Z8, Z9, and Z10 has the shape in which the phase retardation is increased as it is closer to the center axis CA. Thus, each unit device U1 to U5 may refract the light passing therethrough to be condensed at a focus position using diffraction, extinction interference, and constructive interference of the light.

As shown in FIG. 6, the first to tenth zones Z1 to Z10 are charged with electric charges and a polarity of the electric charges in each zone Z1 to Z10 is inverted every zone. The polarity of the electric charge is determined whether a difference in voltage between the first and second electrode layers 412 and 422 is a positive (+) value or a negative (−) value.

For instance, when the first zone Z1 is charged with positive electric charges (+Q) in an odd-numbered frame ODD-F, the second zone Z2 disposed adjacent to the first zone Z1 is charged with negative electric charges (−Q). When the polarity of the electric charges is inverted every zone, the fifth and sixth zones Z5 and Z6, which are disposed nearest to the center axis CA, are charged with the electric charges to have different polarities from each other.

Then, the first zone Z1 is charged with the negative electric charges (−Q) in an even-numbered frame EVEN-F and the second zone Z2 disposed adjacent to the first zone Z1 is charged with positive electric charges (+Q). In the even-numbered frame EVEN-F, the polarity of the electric charges is inverted every zone, and thus the fifth and sixth zones Z5 and Z6, which are disposed nearest to the center axis CA, are charged with the electric charges to have different polarities from each other.

In FIG. 6, the polarity of the first to tenth zones Z1 to Z10 is inverted every frame, but it should not be limited thereto or thereby. That is, the polarity of the first to tenth zones Z1 to Z10 may be inverted every two or three frames.

The number of the zones disposed at the left side of the center axis CA is equal to the number of the zones disposed at the right side of the center axis CA. Sizes of the zones disposed at the left side of the center axis CA and at the right side of the center axis CA are in line symmetry. In detail, the first to fifth zones Z1 to Z5 have the symmetrical sizes with the sixth to tenth zones Z6 to Z10 with reference to the center axis CA. Accordingly, the total amount of the positive electric charges is substantially the same as that of the negative electric charges in each unit device at every frame. The polarities of the zones having the same size disposed at the left side of the center axis CA and at the right side of the center axis CA are opposite to each other.

Therefore, a flicker is reduced and a direct current residue is prevented when the switching panel 400 is driven in a polarity inversion driving manner.

Figure 7:
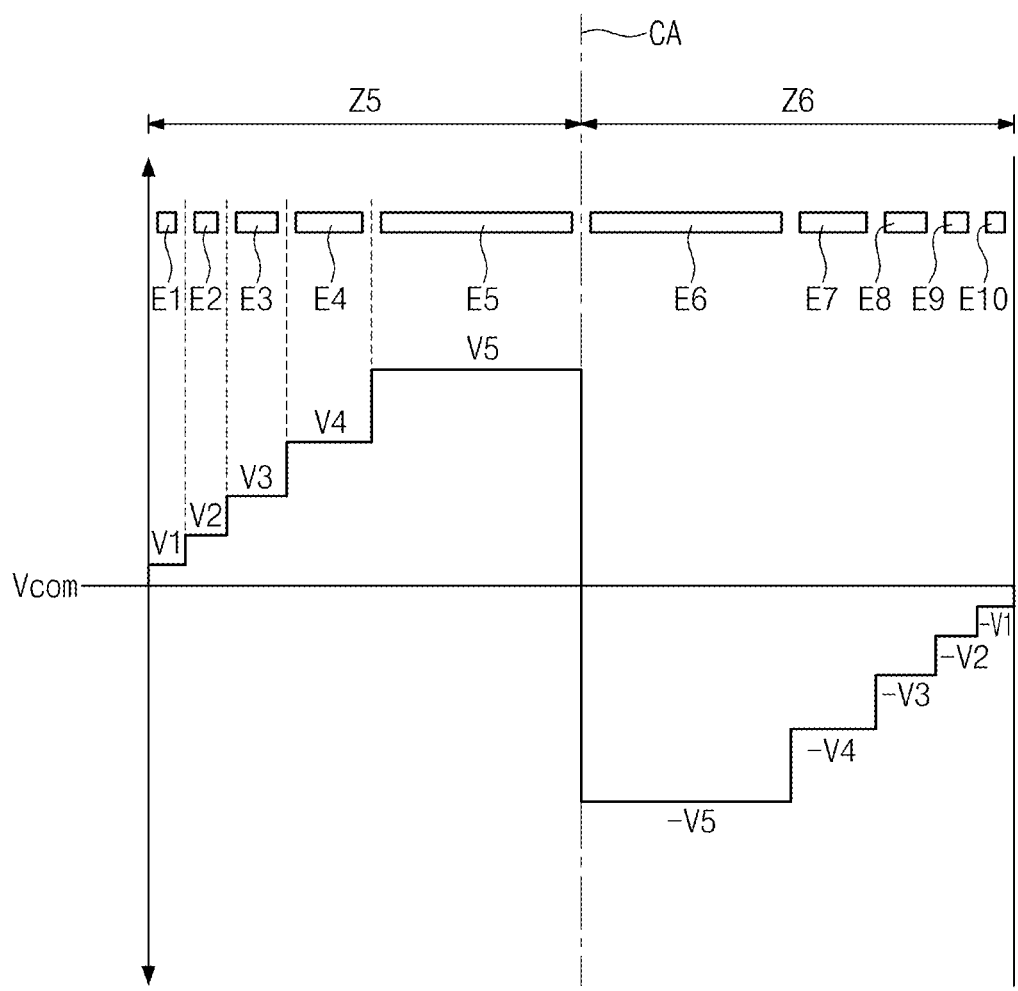
FIG. 7 is a view showing a configuration of the electrodes and driving voltages applied to electrodes disposed in fifth and sixth zones shown in FIG. 6.

FIG. 7 is a view showing a configuration of the electrodes and driving voltages applied to the electrodes disposed in the fifth and sixth zones Z5 and Z6 shown in FIG. 6. FIG. 7 shows the driving voltages applied to the fifth and sixth zones Z5 and Z6 among the first to tenth zones Z1 to Z10, but the other zones are applied with voltages in the same way. Each of the fifth zone Z5 and the sixth zone Z6 may include a plurality of electrodes. The plurality of electrodes may not overlap the center axis. The plurality of electrodes in the fifth zone Z5 and the plurality of electrodes in the sixth zone Z6 may have a line of symmetry. The center axis may be a line of symmetry. A pair of electrodes in the fifth zone Z5 and the sixth zone Z6 which meet each other when folded along the center axis are configured to have a same voltage but opposite polarity with respect to a common voltage. Referring to FIGS. 6 and 7, the fifth zone Z5 is applied with the positive driving voltage with respect to a common voltage Vcom and the sixth zone Z6 is applied with the negative driving voltage with respect to the common voltage Vcom.

The common voltage Vcom may be the voltage applied to the second electrode layer 422 (refer to FIG. 4) and the driving voltages may be the voltage applied to the first electrode layer 412 (refer to FIG. 4). When the driving voltages are greater than the common voltage Vcom, the driving voltages are the positive driving voltages, and when the driving voltages are smaller than the common voltage Vcom, the driving voltages are the negative driving voltages.

In addition, the first electrode layer 412 is configured to include a plurality of electrodes in one zone as shown in FIG. 7. The electrodes are applied with the driving voltages having different voltage levels from each other in each zone.

As an example, first, second, third, fourth, and fifth electrodes E1, E2, E3, E4, and E5 are arranged in the fifth zone Z5 and sixth, seventh, eighth, ninth, and tenth electrodes E6, E7, E8, E9, and E10 are arranged in the sixth zone Z6.

The first to fifth electrodes E1 to E5 have a width that increases as a distance from the center axis CA is decreased, and the sixth to tenth electrodes E6 to E10 have a width that increases as a distance from the center axis CA is decreased. In addition, the first to fifth electrodes E1 to E5 are symmetrical with the sixth to tenth electrodes E6 to E10 with respect to the center axis CA.

The first to fifth electrodes E1 to E5 receive the driving voltages having different voltage levels from each other. Hereinafter, the voltages respectively applied to the first to fifth electrodes E1 to E5 are referred to as first to fifth positive driving voltages V1, V2, V3, V4, and V5, and the voltages respectively applied to the sixth to tenth electrodes E6 to E10 are referred to as first to fifth negative driving voltages −V5, −V4, −V3, −V2, and −V1.

The first to fifth positive driving voltages V1 to V5 have the positive polarity with respect to the common voltage Vcom and the voltage level of the first to fifth positive driving voltages V1 to V5 increases in a stepwise manner with respect to the common voltage Vcom. In addition, the first to fifth negative driving voltages −V5 to −V1 have the positive polarity with respect to the common voltage Vcom and the voltage level of the first to fifth negative driving voltages −V5 to −V1 increases in a stepwise manner with respect to the common voltage Vcom.

Absolute values of the first to fifth positive driving values V1 to V5 with respect to the common voltage Vcom are substantially the same as absolute values of the first to fifth negative voltages −V5 to −V1 with respect to the common voltage Vcom, respectively. Accordingly, the polarity of the electric charges charged in the fifth zone Z5 is different from the polarity of the electric charges charged in the sixth zone Z6, but the amount of the electric charges charged in the fifth zone Z5 is substantially the same as the amount of the electric charges charged in the sixth zone Z6.

Therefore, a coupling phenomenon of the common voltage is prevented from occurring when the switching panel 400 is driven in the polarity inversion driving manner, and thus the reliability of the image display apparatus 500 is improved.

In the present exemplary embodiment, the first electrode layer 412 includes the electrodes and is disposed on the first substrate 410 disposed adjacent to the display panel, but they should not be limited thereto or thereby. According to another embodiment, the first electrode layer 412 may be disposed on the second substrate 420, and in this case, the second electrode layer 422 may be disposed on the first substrate 410.

Figure 8:
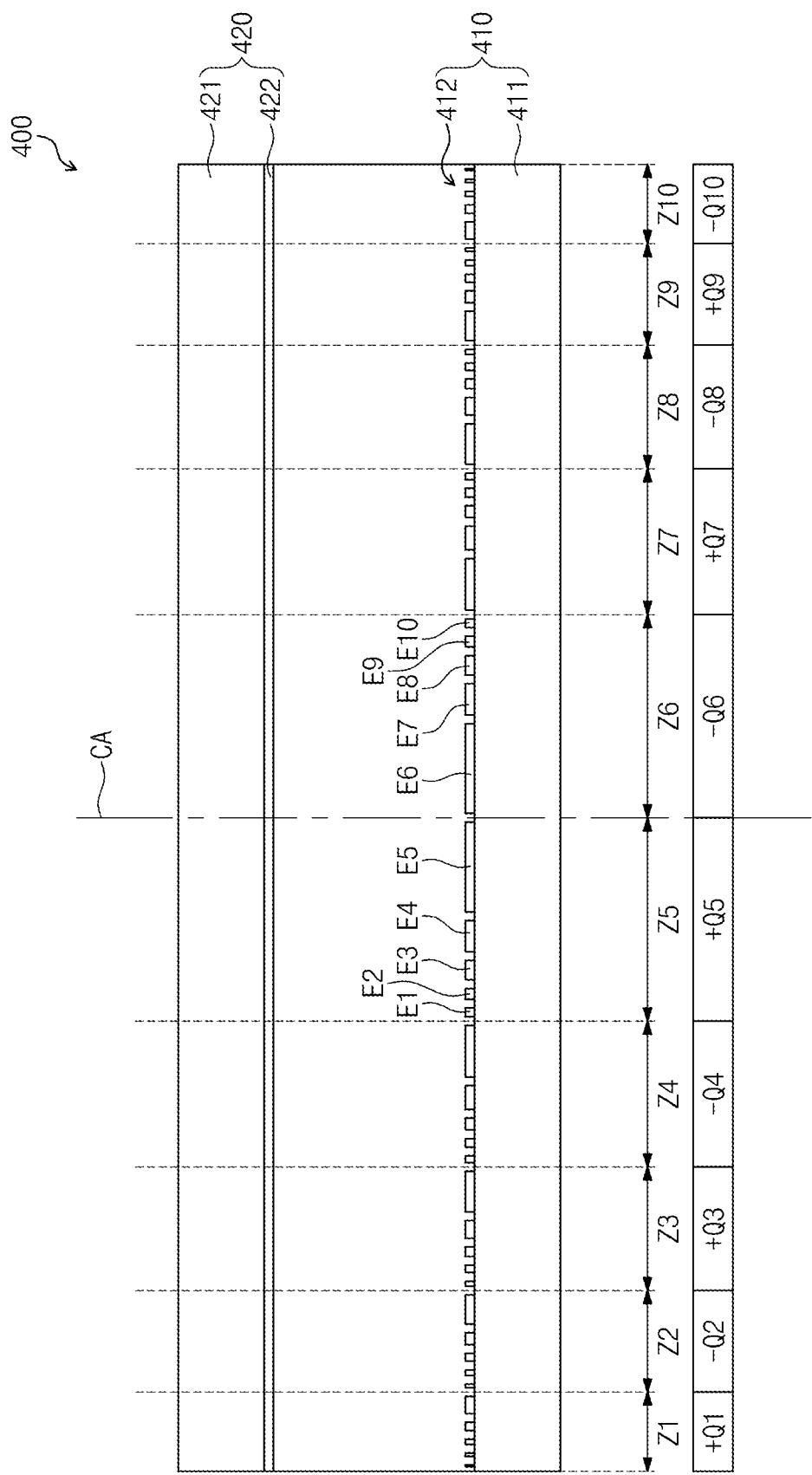
FIG. 8 is a cross-sectional view showing a switching panel in which a first electrode layer show in FIG. 3 has a single-layer structure.

FIG. 8 is a cross-sectional view showing a switching panel in which the first electrode layer show in FIG. 5 has a single-layer structure.

Referring to FIG. 8, the switching panel 400 includes the first substrate 410, the second substrate 420, and the liquid crystal layer 430 interposed between the first and second substrates 410 and 420. The first substrate 410 includes a first base substrate 411 and a first electrode layer 412 disposed on the first base substrate 411 and the second substrate 420 includes a second base substrate 421 and a second electrode layer 422 disposed on the second substrate 421.

The first electrode layer 412 may be patterned such that plural electrodes E1 to E5 or E6 to E10 are disposed in each of the zones Z1 to Z10 and the second electrode layer 422 may be integrally formed as a single unitary and individual unit. The plural electrodes E1 to E5 or E6 to E10 may have different sizes. In addition, the number of the electrodes arranged in each zone Z1 to Z10 varies in accordance with the width of each zone Z1 to Z10.

FIG. 8 shows the electrodes E1 to E10 disposed on the first base substrate 411 in the single-layer structure, but one or more insulating layers are interposed between the first base substrate 411 and the electrodes E1 to E10, or one or more insulating layers may be interposed between the electrodes E1 to E10.

When the switching panel 400 is operated in the 3D mode, the common voltage Vcom (refer to FIG. 7) is applied to the second electrode layer 422 and the positive or negative driving voltage against the common voltage Vcom is applied to the electrodes of the first electrode layer 412. The polarity of the electric charges charged in each zone Z1 to Z10 is determined depending on the polarity of the driving voltage.

The polarity of the electric charges charged in each zone Z1 to Z10 is inverted every zone.

The electrodes E1 to E10 arranged in each zone Z1 to Z10 have the width that increases as the distance from the center axis CA decreases. The fifth and sixth zones Z5 and Z6, which are disposed adjacent to the center axis CA, have the greatest width compared to the other zones. In addition, the electrodes E1 to E5 arranged in the fifth zone Z5 are electrically separated from the electrodes E6 to E10 arranged in the sixth zone Z6. In particular, the fifth electrode E5 in the fifth zone Z5 and the sixth electrode E6 in the sixth zone Z6 are spaced apart from each other. Accordingly, zones adjacent to the center axis, the fifth zone Z5 and the sixth zone Z6, may be charged with the electric charges having different polarities from each other.

Figure 9:
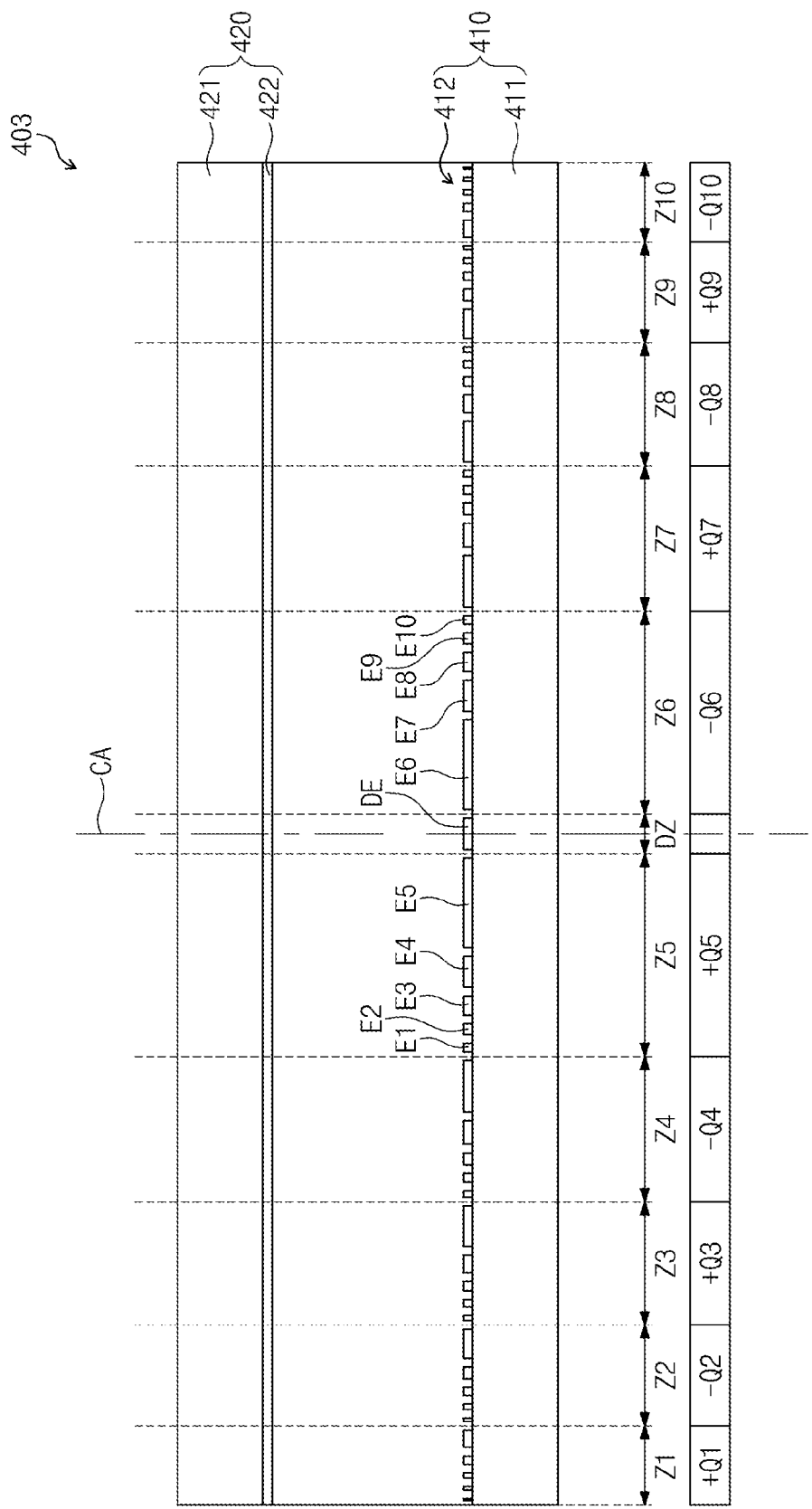
FIG. 9 is a cross-sectional view showing a switching panel including a dummy electrode.
Figure 10:
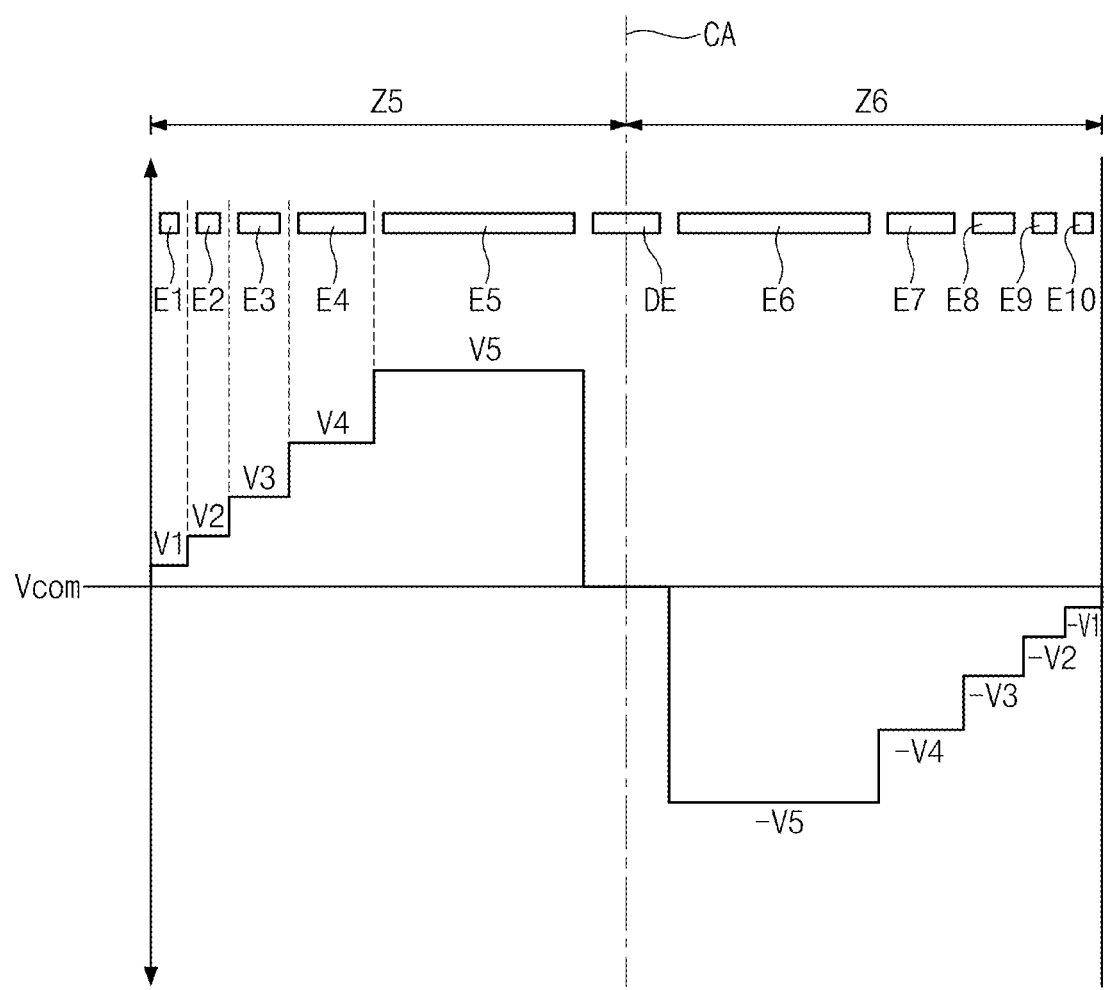
FIG. 10 is a view showing wavelengths of voltages applied to electrodes disposed in fifth and sixth zones shown in FIG. 9.

FIG. 9 is a cross-sectional view showing a switching panel including a dummy electrode and FIG. 10 is a view showing wavelengths of voltages applied to electrodes disposed in the zones adjacent to the center axis, the fifth and the sixth zones, shown in FIG. 9. In FIGS. 9 and 10, the same reference numerals denote the same elements in FIG. 7, and thus detailed descriptions of the same elements will be omitted.

Referring to FIG. 9, the first electrode layer 412 may be patterned such that plural electrodes E1 to E5 or E6 to E10 are disposed in each of the zones Z1 to Z10 and the second electrode layer 422 may be integrally formed as a single unitary and individual unit. The plural electrodes E1 to E5 or E6 to E10 may have different sizes. The dummy electrode may include a first dummy electrode and a second dummy electrode, and the first and second dummy electrodes share a line of symmetry. The center axis may be a line of symmetry. As shown in FIG. 9, each of the unit devices U1 to U5 (refer to FIG. 5) further includes a dummy zone DZ disposed between two zones, e.g., fifth and sixth zones Z5 and Z6, which are disposed at both sides with respect to the center axis CA. The first electrode layer 412 further includes a dummy electrode DE disposed in the dummy zone DZ. The dummy electrode DE is disposed between the fifth electrode E5 and the sixth electrode E6 and electrically insulated from the first to tenth electrodes E1 to D10.

The first to fifth electrodes E1 to E5 have a width that increases as a distance from the center axis CA is decreased, and the sixth to tenth electrodes E6 to E10 have a width that increases as a distance from the center axis CA is decreased. In addition, the first to fifth electrodes E1 to E5 are symmetrical with the sixth to tenth electrodes E6 to E10 with respect to the center axis CA. The dummy electrode has a width smaller than a maximum electrode width of the plurality of electrodes in the first to tenth electrodes E1 to E10. An absolute value of a voltage difference between a dummy voltage applied to the dummy electrode and the common voltage is smaller than that between the driving voltage applied to the plurality of electrodes and the common voltage.

The dummy electrode DE has a width smaller than that of electrodes adjacent to the dummy electrode DE, the fifth and sixth electrodes E5 and E6, but it should not be limited thereto or thereby.

Referring to FIG. 10, the electrodes E1 to E10 are applied with the driving voltages having different voltage levels from each other in each zone.

The first to fifth electrodes E1 to E5 receive the driving voltages having different voltage levels from each other. Hereinafter, the voltages respectively applied to the first to fifth electrodes E1 to E5 are referred to as first to fifth positive driving voltages V1, V2, V3, V4, and V5, and the voltages respectively applied to the sixth to tenth electrodes E6 to E10 are referred to as first to fifth negative driving voltages −V5, −V4, −V3, −V2, and −V1.

The first to fifth positive driving voltages V1 to V5 have the positive polarity with respect to the common voltage Vcom and the voltage level of the first to fifth positive driving voltages V1 to V5 increases in a stepwise manner with respect to the common voltage Vcom. In addition, the first to fifth negative driving voltages −V5 to −V1 have the negative polarity with respect to the common voltage Vcom and the voltage level of the first to fifth negative driving voltages −V5 to −V1 increases in a stepwise manner with respect to the common voltage Vcom.

Absolute values of the first to fifth positive driving values V1 to V5 with respect to the common voltage Vcom are substantially the same as absolute values of the first to fifth negative voltages −V5 to −V1 with respect to the common voltage Vcom, respectively. Accordingly, the polarity of the electric charges charged in the fifth zone Z5 is different from the polarity of the electric charges charged in the sixth zone Z6, but the amount of the electric charges charged in the fifth zone Z5 is substantially the same as the amount of the electric charges charged in the sixth zone Z6.

As an example, the dummy electrode DE receives a voltage having the same voltage level as that of the common voltage Vcom applied to the second electrode layer 422. Accordingly, no electric charges are charged in the dummy zone DZ.

Figure 11:
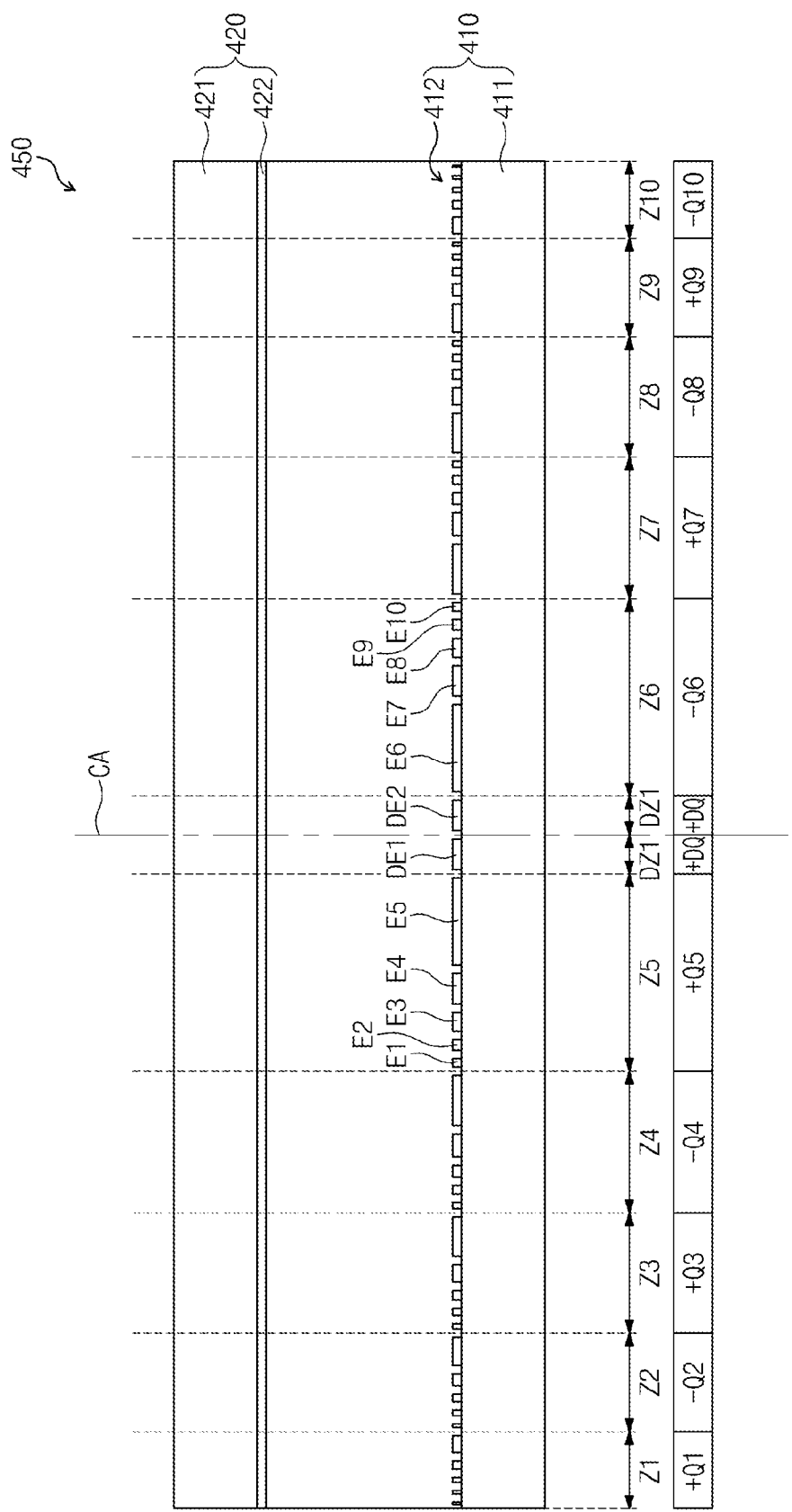
FIG. 11 is a cross-sectional view showing a switching panel according to another exemplary embodiment of the present disclosure.
Figure 12:
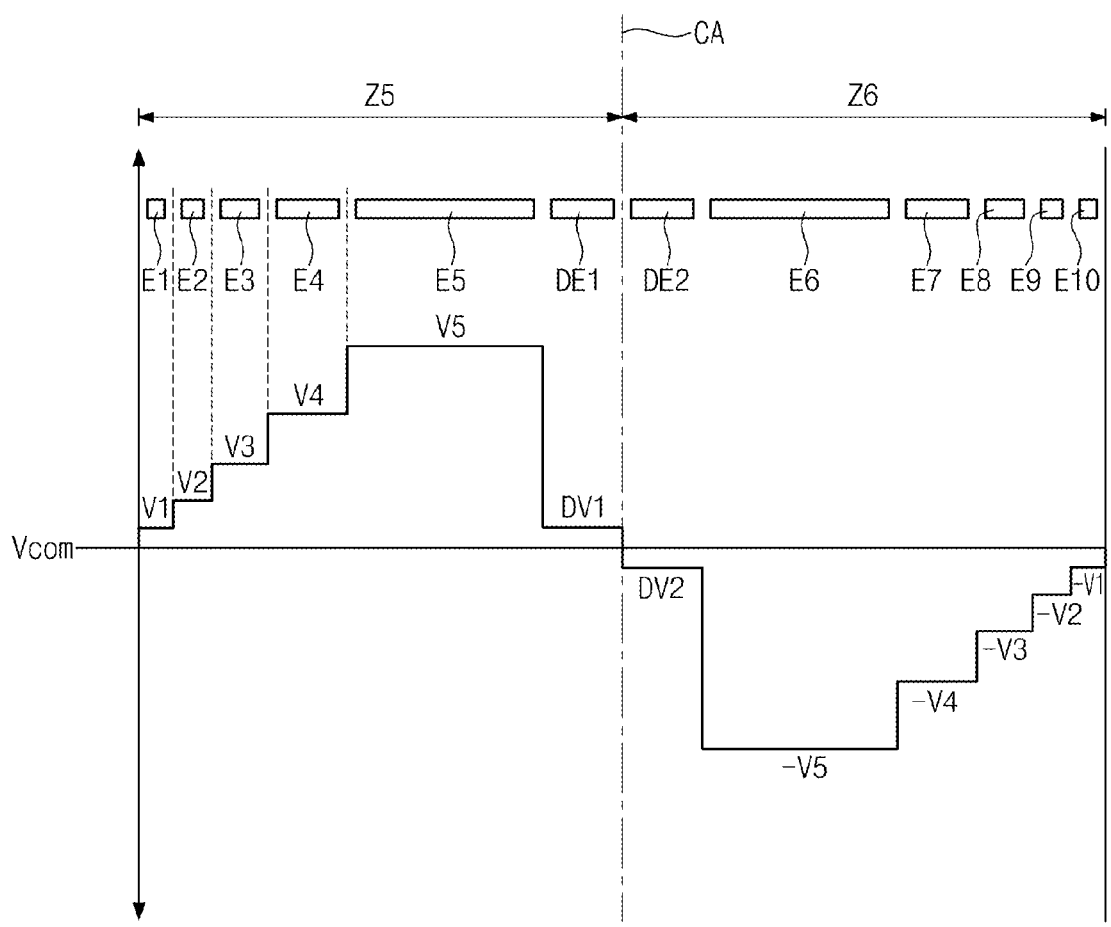
FIG. 12 is a view showing wavelengths of voltages applied to electrodes disposed in fifth and sixth zones shown in FIG. 11.

FIG. 11 is a cross-sectional view showing a switching panel according to another exemplary embodiment of the present disclosure and FIG. 12 is a view showing wavelengths of voltages applied to electrodes disposed in fifth and sixth zones shown in FIG. 11. In FIGS. 11 and 12, the same reference numerals denote the same elements in FIGS. 9 and 10, and thus detailed descriptions of the same elements will be omitted.

Referring to FIG. 11, each of the unit devices U1 to U5 further includes first and second dummy zones DZ1 and DZ2 disposed between two zones, e.g., fifth and sixth zones Z5 and Z6, which are disposed at both sides of the first and the second dummy zones DZ1 and DZ2. The first electrode layer 412 further includes a first dummy electrode DE1 disposed in the first dummy zone DZ1 and a second dummy electrode DE2 disposed in the second dummy zone DZ2. The first and second dummy electrodes DE1 and DE2 are disposed between the fifth electrode E5 and the sixth electrode E6 and electrically insulated from the first to tenth electrodes E1 to D10. In addition, the first and second dummy electrodes DE1 and DE2 are disposed at both sides with respect to the center axis CA, respectively.

The first and second dummy electrodes DE1 and DE2 may have the same width, but they should not be limited thereto or thereby. The first and second dummy electrodes DE1 and DE2 have a width smaller than that of the fifth and sixth electrodes E5 and E6, but it should not be limited thereto or thereby.

Referring to FIG. 12, the first to fifth electrodes E1 to E5 respectively receive the first to fifth positive driving voltages V1, V2, V3, V4, and V5, and the sixth to tenth electrodes E6 to E10 respectively receive first to fifth negative driving voltages −V5, −V4, −V3, −V2, and −V1. The polarity of the driving voltages applied to the first to tenth electrodes E1 to E10 may be inverted every frame.

As an example, the first dummy electrode DE1 is applied with a first dummy voltage DV1 and the second dummy electrode DE2 is applied with a second dummy voltage DV2. The first dummy voltage DV1 may be a positive voltage and the second dummy voltage DV2 may be a negative voltage. The first and second dummy voltages DV1 and DV2 may have different polarities from each other with reference to the common voltage Vcom. In addition, an absolute value of the first dummy voltage DV1 may be substantially the same as an absolute value of the second dummy voltage DV2 with respect to the common voltage Vcom. Therefore, the polarity of the electric charges charged in the first dummy zone DZ1 is different from the polarity of the electric charges charged in the second dummy zone DZ2, but the amount of the electric charges charged in the first dummy zone DZ1 is substantially the same as the amount of the electric charges charged in the second dummy zone DZ2.

As another example of the present disclosure, the first and second dummy electrodes DE1 and DE2 may receive a voltage having the same voltage level as that of the common voltage Vcom applied to the second electrode layer 422. Accordingly, no electric charges are charged in the first and second dummy zones DZ1 and DZ2.

Figure 13:
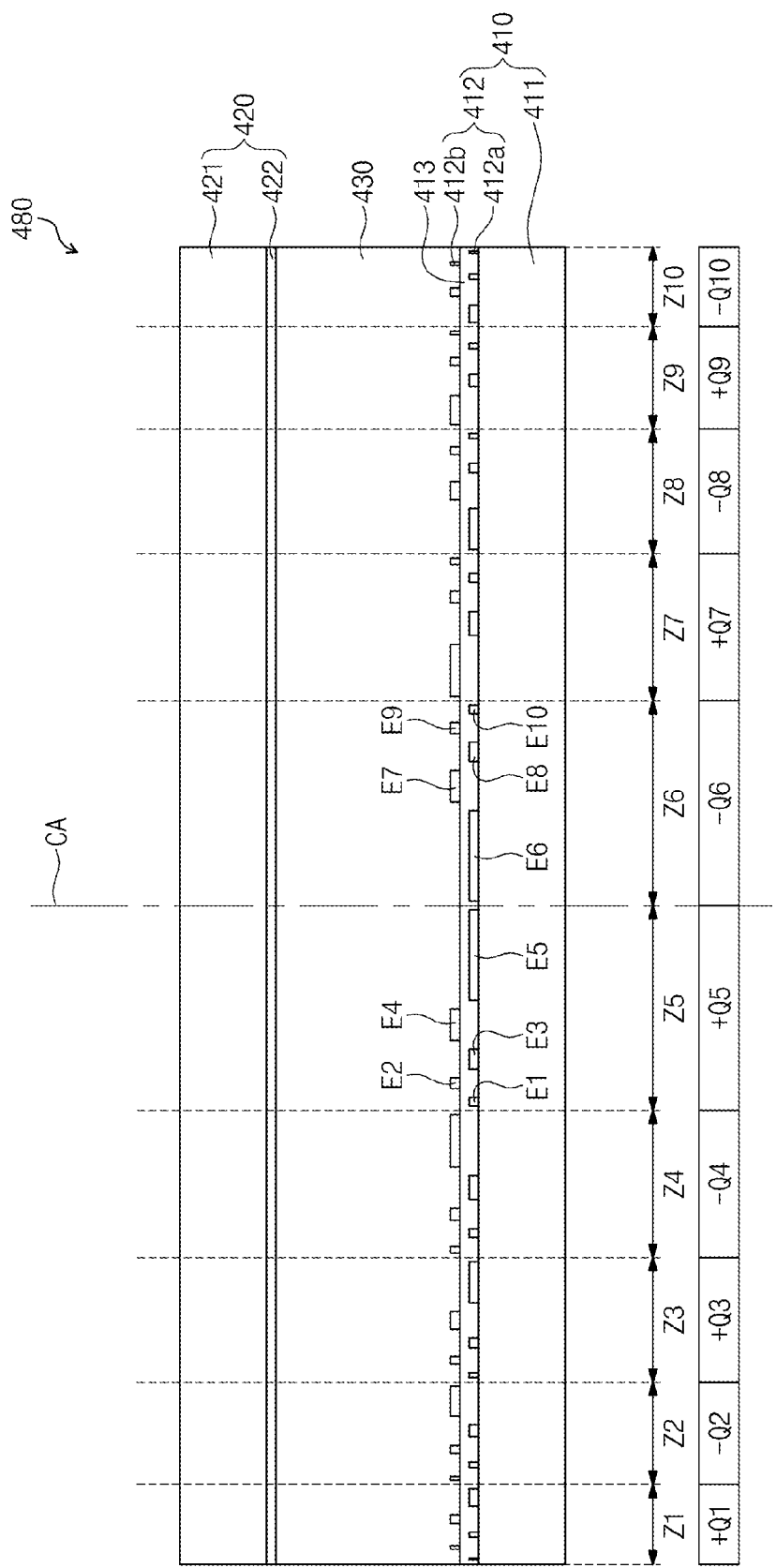
FIG. 13 is a cross-sectional view showing a switching panel according to another exemplary embodiment of the present disclosure.

FIG. 13 is a cross-sectional view showing a switching panel according to another exemplary embodiment of the present disclosure.

Referring to FIG. 13, the first electrode layer 412 includes a lower electrode array 412a and an upper electrode array 412b. The lower electrode array 412a is disposed on the first base substrate 411 and covered by an inter-insulating layer 413. The upper electrode array 412b is disposed on the inter-insulating layer 413 and electrically insulated from the lower electrode array 412a.

The lower electrode array 412a includes a plurality of lower electrodes and the upper electrode array 412b includes a plurality of upper electrodes. Each of the zones Z1 to Z10 includes at least one lower electrode and at least one upper electrode. As an example, the first, third, and fifth electrodes E1, E3, and E5 are disposed in the fifth zone Z5 as the lower electrodes and the second and fourth electrodes E2 and E4 are disposed in the fifth zone Z5 as the upper electrodes. The electrodes disposed in the fifth zone Z5 are disposed to be symmetrical with the electrodes disposed in the sixth zone Z6. Accordingly, the sixth, eighth, and tenth electrodes E6, E8, and E10 are disposed in the sixth zone Z6 as the lower electrodes and the seventh and ninth electrodes E7 and E9 are disposed in the sixth zone Z6 as the upper electrodes.

The voltage level of the voltages applied to the electrodes in each zone Z1 to Z10 varies in a stepwise manner with respect to the center axis CA. As an example, a difference in voltage level between the common voltage applied to the second electrode layer 412 in each zone Z1 to Z10 and the voltage applied to the electrodes in each zone Z1 to Z10 is decreased in a stepwise manner as a distance from the center axis CA increases. In addition, the width of the electrodes in each zone Z1 to Z10 is decreased as the distance from the center axis CA increases.

As shown in FIG. 13, the electric charges are charged in the first to tenth zones Z1 to Z10 and the polarity of the electric charges charged in the first to tenth zones Z1 to Z10 is inverted every zone. The fifth and sixth zones Z5 and Z6, which are disposed nearest to the center axis CA, are charged with the electric charges to have different polarities from each other.

The number of the zones disposed at the left side of the center axis CA is equal to the number of the zones disposed at the right side of the center axis CA. Sizes of the zones disposed at the left side of the center axis CA and at the right side of the center axis CA are in line symmetry. In detail, the sizes of the first to fifth zones Z1 to Z5 are substantially symmetrical with the sizes of the sixth to tenth zones Z6 to Z10 with respect to the center axis CA. Therefore, the total amount of the electric charges charged in the zones disposed at the left side of the center axis CA may be substantially the same as the amount of the electric charges charged in the zones disposed at the right side of the center axis CA. The polarities of the zones having the same size disposed at the left side of the center axis CA and at the right side of the center axis CA are opposite to each other. Thus, the flicker is reduced and the direct current residue is prevented when the switching panel 480 is driven in a polarity inversion driving manner.

Figure 14:
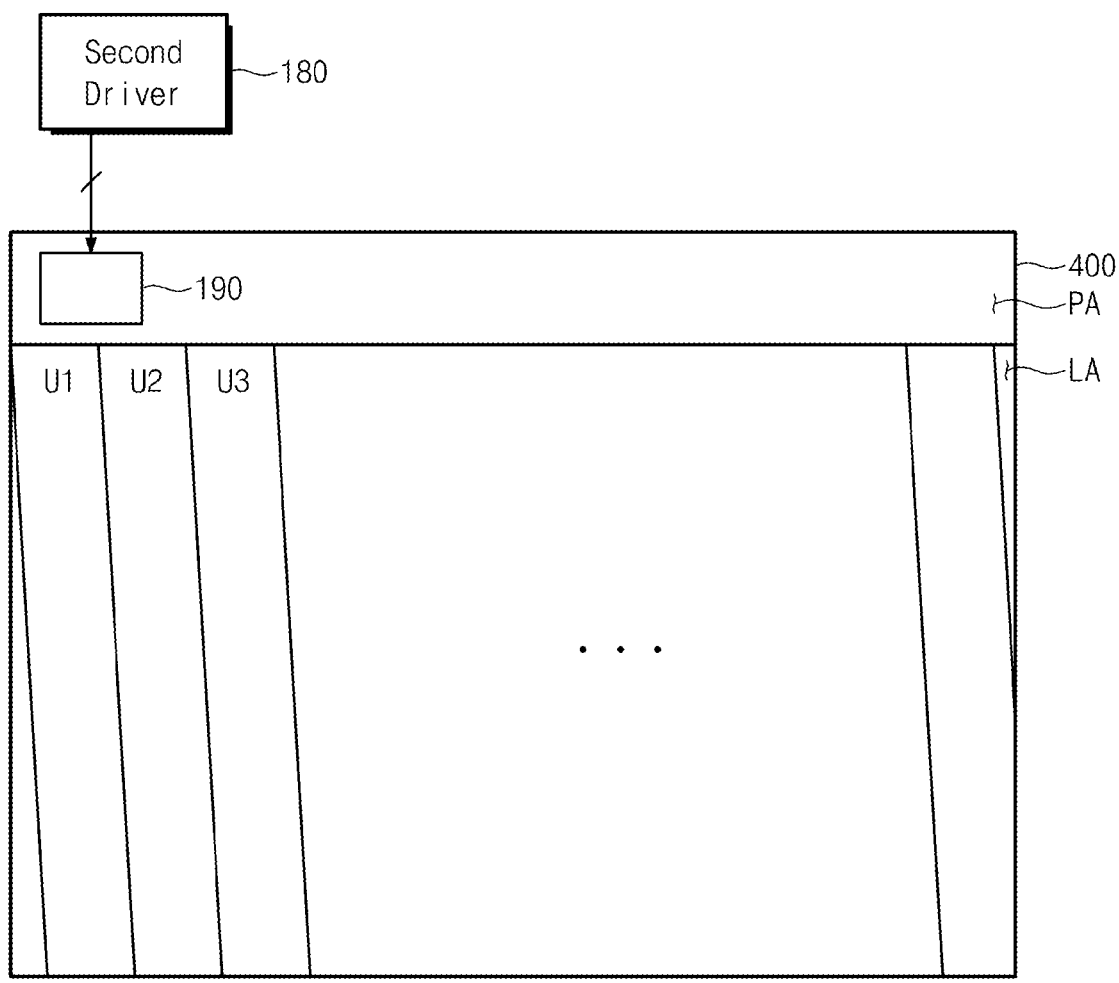
FIG. 14 is a plan view showing a switching panel according to an exemplary embodiment of the present disclosure.
Figure 15:
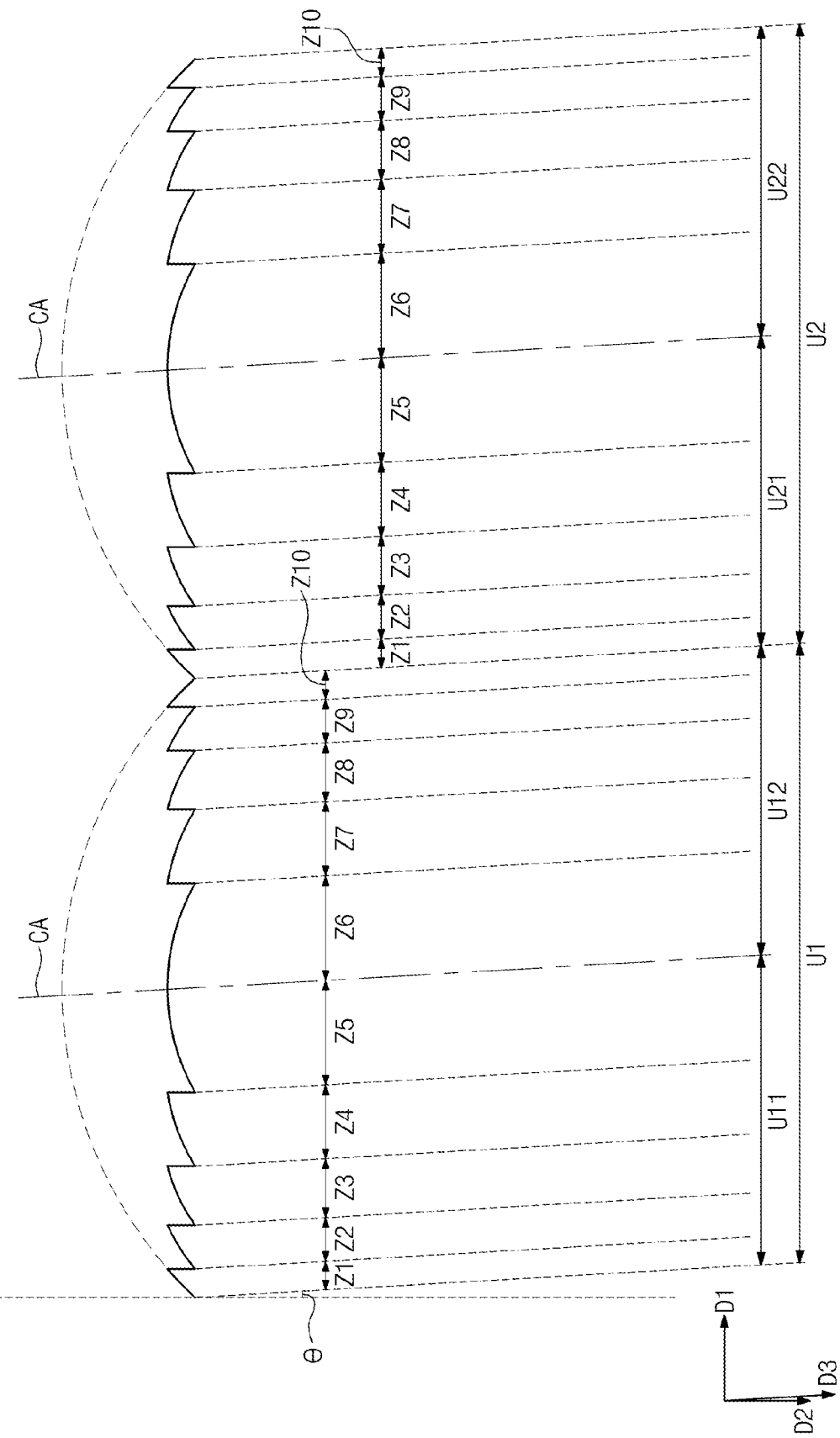
FIG. 15 is an enlarged view showing first and second unit devices.

FIG. 14 is a plan view showing a switching panel according to an exemplary embodiment of the present disclosure and FIG. 15 is an enlarged view showing first and second unit devices.

Referring to FIG. 14, the switching panel 400 includes the first substrate 410 (not shown), the second substrate 420 (not shown) facing the first substrate 410, and the liquid crystal layer 430 (not shown) interposed between the first and second substrates 410 and 420.

When viewed in a plan view, the switching panel 400 includes a lens area LA in which the unit devices U1, U2, and U3 are arranged and a peripheral area PA disposed at one side of the lens area LA. The unit devices U1, U2, and U3 are arranged along a first direction D1 in the lens area LA. Each of the unit devices U1, U2, and U3 extends in a third direction D3 inclined at a predetermined angle θ with respect to a second direction D2 substantially perpendicular to the first direction D1.

As shown in FIG. 15, each of the first and second unit devices U1 and U2 includes the first to tenth zones Z1 to Z10. Each of the first to tenth zones Z1 to Z10 has the shape extending in the third direction D3 and the first to tenth zones Z1 to Z10 are sequentially arranged in the second direction D2.

In addition, the first unit device U1 includes first sub-unit devices U11 and U12 disposed at the left side of the center axis CA and at the right side of the center axis CA, respectively. The second unit device U2 includes second sub-unit devices U21 and U22 disposed at the right side of the center axis CA and at the right side of the center axis CA, respectively. Each of the sub-unit devices at the left side of the center axis CA, U11 and U21, includes the first to fifth zones Z1 to Z5 and each of the sub-unit devices at the right side of the center axis CA, U21 and U22, includes the sixth to tenth zones Z6 to Z10. The first to fifth zones Z1 to Z5 are in line symmetry with the sixth to tenth zones Z6 to Z10 having the center axis CA as a symmetry line.

Although not shown in FIG. 15, each of the first to tenth zones Z1 to Z10 may include a plurality of electrodes (not shown), which extend in the third direction D3. The electrodes may be arranged in the first direction D1.

Further, at least one dummy zone may be disposed between the fifth and sixth zones Z5 and Z6.

Referring to FIG. 14 again, a plurality of lines (not shown) is arranged in the peripheral area PA to apply the driving voltages provided from the second driver 180 to the electrodes. In addition, a sharing circuit 190 is further disposed between the second driver 180 and the lines in the peripheral area PA.

Figure 16:
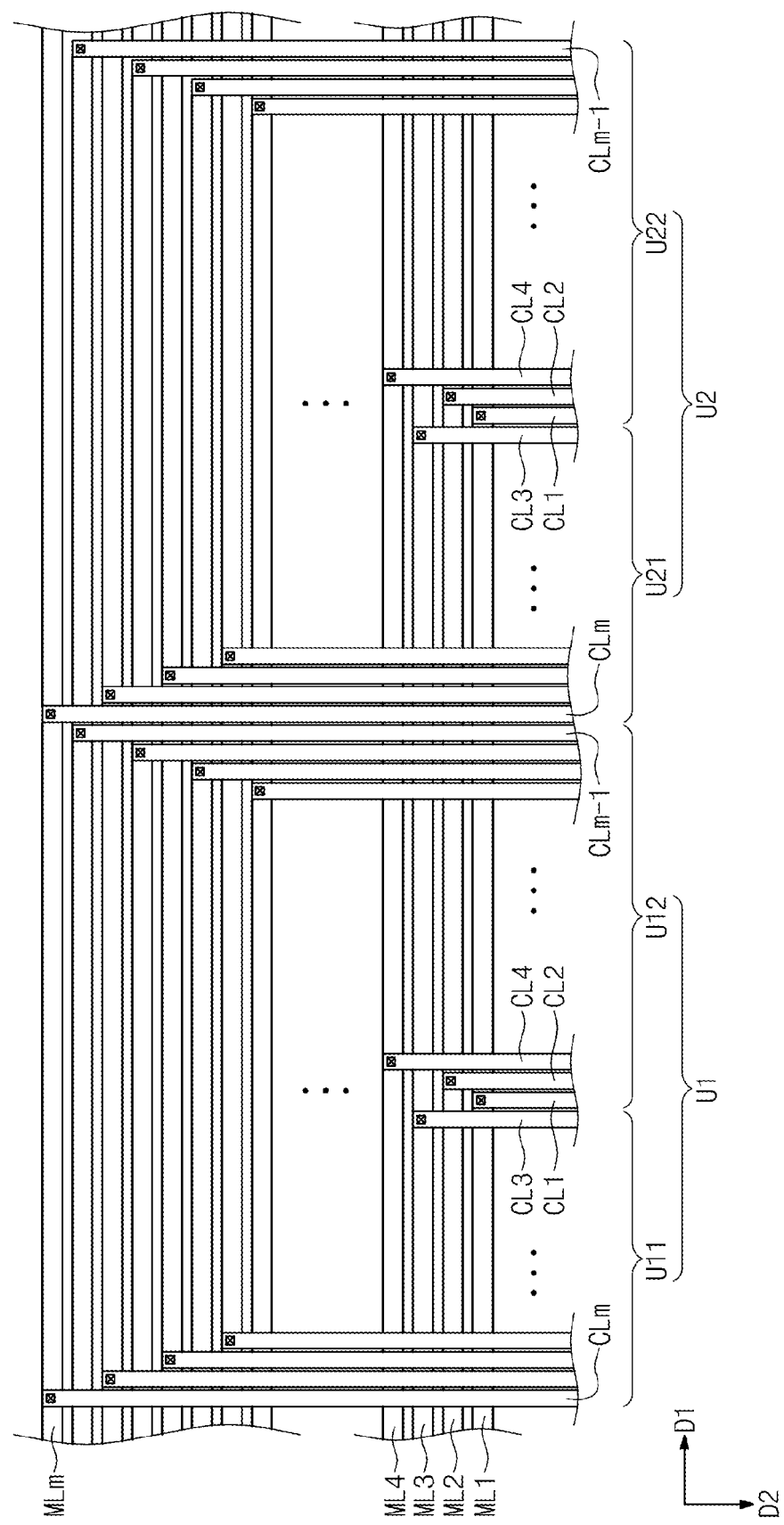
FIG. 16 is a plan view showing lines disposed in a peripheral area.
Figure 17:
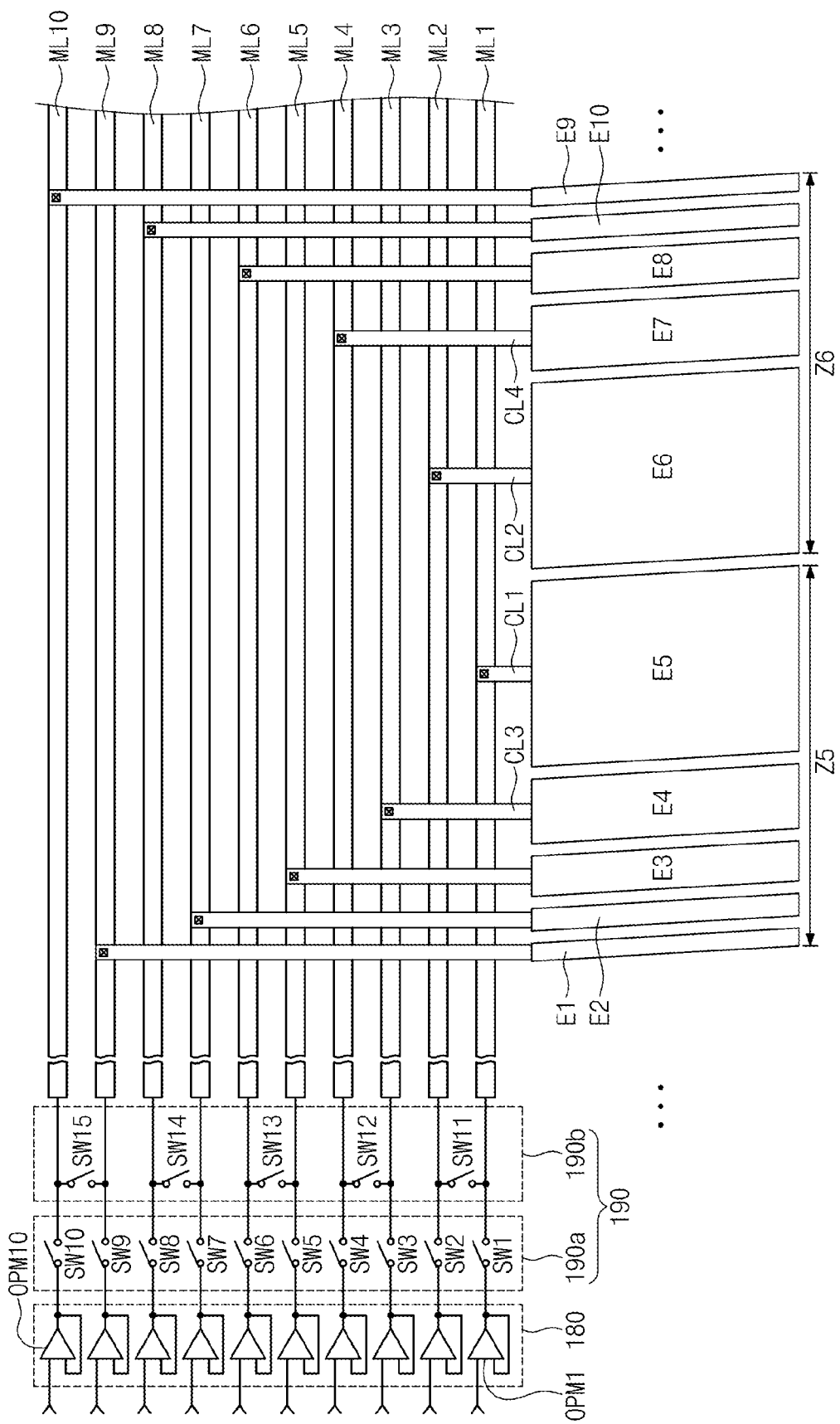
FIG. 17 is a circuit diagram showing a connection relation between a sharing circuit and lines.

FIG. 16 is a plan view showing the lines disposed in the peripheral area PA and FIG. 17 is a circuit diagram showing a connection relation between the sharing circuit 180 and the lines.

Referring to FIG. 16, m main lines ML1 to MLm and m connection lines CL1 to CLm are disposed in the peripheral area PA of the switching panel 400. In this case, the first electrode layer of each of the first and second unit devices U1 and U2 includes m electrodes. That is, the number of the main lines ML1 to MLm and the number of the connection lines CL1 to CLm are equal to the number of the electrodes. The first unit device U1 includes the first sub-unit devices U11 and U12 disposed at left and right sides of the center axis CA, respectively, and the second unit device U2 includes the second sub-unit devices U21 and U22 disposed at left and right sides of the center axis CA, respectively. The sub-unit device U11 and U21 are connected to m/2 main lines ML1, ML3, . . . , MLm−1 and m/2 connection lines CL1, CL3, . . . , CLm−1, and the sub-unit device U12 and U22 are connected to the other m/2 main lines ML2, ML4, . . . , MLm and the other m/2 connection lines CL2, CL4, . . . , CLm.

In FIG. 16, the main lines ML1 to MLm have the same width, but the width of each of the main lines ML1 to MLm varies depending on the width of a corresponding electrode of the electrodes. In detail, as the electrode connected to the line has a relatively greater width, the width of the corresponding main line is designed to be greater than that of the other lines. In addition, the width of the connection lines CL1 to CLm varies depending on the width of the corresponding main line and the width of the corresponding electrode.

The main lines ML1 to MLm extend in the first direction D1, in which the unit devices U1 and U2 are arranged, and are arranged in the second direction D2 to be spaced apart from each other. The connection lines CL1 to CLm extend in the second direction D2. The connection lines CL1 to CLm are disposed on a layer different from a layer on which the main lines ML1 to MLm are disposed, and each of the connection lines CL1 to CLm is electrically connected to the corresponding main line through a contact hole.

The connection lines CL1 to CLm have a length that varies depending on a distance between each of the main lines ML1 to MLm and the corresponding electrode. In addition, the width of each of the main lines ML1 to MLm varies depending on the distance between the corresponding electrode and each of the main lines ML1 to MLm. For instance, the width of each of the main lines ML1 to MLm increases as a distance from the lens area LA decreases.

As shown in FIG. 17, the sharing circuit 190 is disposed between the second driver 180 and the main lines ML1 to MLm. FIG. 17 shows only first to tenth main lines ML1 to ML10 among the main lines ML1 to MLm. The sharing circuit 190 includes a first switching circuit 190a connected to one end of the first to tenth main lines ML1 to ML10 and a second switching circuits 190b connected to between two main lines adjacent to each other among the first to tenth main lines ML1 to ML10.

For the convenience of explanation, FIG. 17 shows only a plurality of output butters OPM1 to OPM10 from which a plurality of driving voltages applied to the first to tenth main lines ML1 to ML10 is output among components included in the second driver 180, but the second driver 180 may further include the other components.

The first to tenth electrodes E1 to E10 are disposed in zones adjacent to a center axis CA (not shown), the fifth and sixth zones Z5 and Z6 of the lens area LA, and the first to tenth main lines ML1 to ML10 and the first to tenth connection lines CL1 to CLm are disposed in the peripheral area PA.

The first switching circuit 190a includes first to tenth switch devices SW1 to SW10 electrically connected to the first to tenth main lines ML1 to ML10 in a one-to-one correspondence, one end of each of the first to tenth switch devices SW1 to SW10 is connected to an output terminal of a corresponding output buffer of the output buffers OPM1 to OPM10, and the other end of each of the first to tenth switch devices SW1 to SW10 is connected to the corresponding main line of the main lines ML1 to ML10.

The second switching circuit 190b includes eleventh to fifteenth switch devices SW11 to SW15. The eleventh to fifteenth switch devices SW11 to SW15 are respectively disposed between the first and second main lines ML1 and ML2, between the third and fourth main lines ML3 and ML4, between the fifth and sixth main lines ML5 and ML6, between the seventh and eighth main lines ML7 and ML8, and between the ninth and tenth main lines ML9 and ML10.

The first and second main lines ML1 and ML2 are respectively connected to the fifth electrode E5 of the fifth zone Z5 and the sixth electrode E6 of the sixth zone Z6. The fifth and sixth electrodes E5 and E6 may have the widest width in the unit devices. Therefore, one of the first and second main lines ML1 and ML2 connected to the fifth and sixth electrodes E5 and E6 may be disposed adjacent to the lens area LA.

The first and second main lines ML1 and ML2 receive the fifth and sixth driving voltages applied to the fifth and sixth electrodes E5 and E6 from the first and second output buffers OPM1 and OPM2. The fifth and sixth driving voltages have different polarities from each other with respect to the common voltage Vcom and have the same voltage difference with respect to the common voltage Vcom.

When the first and second switch devices SW1 and SW2 are turned on and the eleventh switch device SW11 is turned off, the fifth and sixth driving voltages output from the first and second output buffers OPM1 and OPM2 are applied to the first and second main lines ML1 and ML2, respectively. Then, when the first and second switch devices SW1 and SW2 are turned off and the eleventh switch device SW11 is turned on, the first and second main lines ML1 and ML2 are electrically connected to each other to share the electric charges. Thus, the fifth voltage gradually decreases to the common voltage Vcom and the sixth driving voltage gradually increases to the common voltage Vcom.

The third and fourth main lines ML3 and ML4 are respectively connected to the fourth electrode E4 of the fifth zone Z5 and the seventh electrode E7 of the sixth zone Z6. The third and fourth main lines ML3 and ML4 receive the fourth and seventh driving voltages applied to the fourth and seventh electrodes E4 and E7 from the third and fourth output buffers OPM3 and OPM4. The fourth and seventh driving voltages have different polarities from each other with respect to the common voltage Vcom and have the same voltage difference with respect to the common voltage Vcom.

When the third and fourth switch devices SW3 and SW4 are turned on and the twelfth switch device SW12 is turned off, the fourth and seventh driving voltages output from the third and fourth output buffers OPM3 and OPM4 are applied to the third and fourth main lines ML3 and ML4, respectively. Then, when the third and fourth switch devices SW3 and SW4 are turned off and the twelfth switch device SW12 is turned on, the third and fourth main lines ML3 and ML4 are electrically connected to each other to share the electric charges. Thus, the fourth voltage gradually decreases to the common voltage Vcom and the seventh driving voltage gradually increases to the common voltage Vcom.

The sharing of the electric charges occurs in the fifth to tenth main lines ML5 to ML10 in the same way mentioned above.

Figure 18:
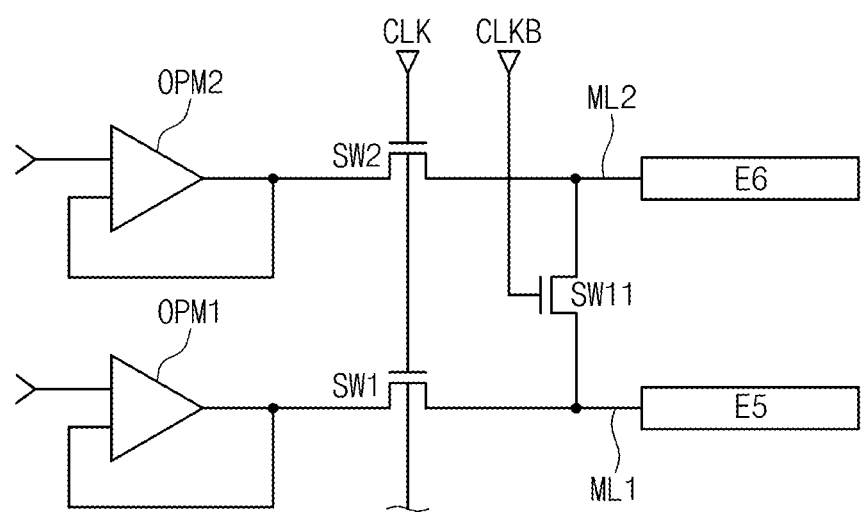
FIG. 18 is a circuit diagram showing a connection relation between first and second main lines, first and second switching devices, and eleventh switching device shown in FIG. 17.
Figure 19:
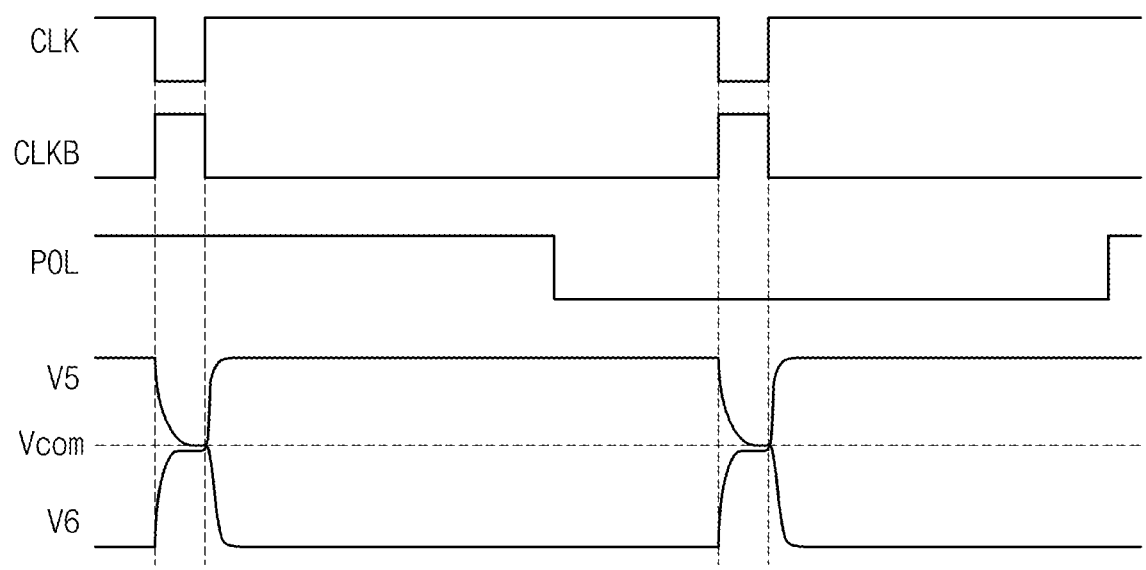
FIG. 19 is a waveform diagram showing an electric potential of fifth and sixth electrodes shown in FIG. 18.

FIG. 18 is a circuit diagram showing a connection relation between the first and second main lines, ML1 and ML2, the first and second switching devices, SW1 and SW2, and the eleventh switching device, SW11, shown in FIG. 17 and FIG. 19 is a waveform diagram showing an electric potential of the fifth and sixth electrodes, E5 and E6, shown in FIG. 18.

Referring to FIGS. 18 and 19, the first switch device SW1 includes a first source electrode connected to an input terminal of the first output buffer OPM1, a first gate electrode applied with a clock signal CLK, and a first drain electrode connected to the fifth electrode. The second switch device SW2 includes a second source electrode connected to an input terminal of the second output buffer OPM2, a second gate electrode applied with the clock signal CLK, and a second drain electrode connected to the sixth electrode E6.

The eleventh switch device SW11 includes a third source electrode connected to the first main line ML1, a third gate electrode applied with a clock bar signal CLKB having a phase opposite to that of the clock signal CLK, and a third drain connected to the second main line ML2.

When the clock signal CLK has a high level in the odd-numbered frame ODD-F, the first and second switch devices SW1 and SW2 are turned on and the eleventh switch device SW11 is turned off. Accordingly, the fifth and sixth driving voltages V5 and V6 output from the first and second output buffers OPM1 and OPM2 are applied to the first and second main lines ML1 and ML2 through the first and second switch devices SW1 and SW2. Since the eleventh switch device SW11 is turned off, the fifth and sixth driving voltages V5 and V6 applied to the first and second main lines ML1 and ML2 are respectively applied to the fifth and sixth electrodes E5 and E6.

As an example, the fifth driving voltage V5 has the positive polarity in a period during which a polarity inversion signal is high, and the sixth driving voltage V6 has the negative polarity in a period during which the polarity inversion signal is high. On the contrary, the fifth driving voltage V5 has the negative polarity in the period during which the polarity inversion signal is low, and the sixth driving voltage V6 has the positive polarity in the period during which the polarity inversion signal is low.

When the clock signal CLK is transited to the low level and the clock bar signal CLKB is transited to the high level, the first and second switch devices SW1 and SW2 are turned off and the eleventh switch device SW11 is turned on. Then, the first main line ML1 is electrically connected to the second main line ML2 through the eleventh switch device SW11. Therefore, the fifth and sixth electrodes E5 and E6 share the electric charges, and thus the fifth driving voltage V5 decreases to the common voltage Vcom and the sixth driving voltage V6 increases to the common voltage Vcom.

Then, when the clock bar signal CLKB is transited to the low level in the even-numbered frame EVEN-F, the fifth and sixth driving voltages V5 and V6 stop sharing the electric charges, the fifth electrode E5 starts to be charged with the negative fifth driving voltage V5, and the sixth electrode E6 starts to be charged with the positive sixth driving voltage V6.

As described above, when the electrodes having the different polarities and the same difference in electric potential share the electric charges in the predetermined period, a power consumption required to invert the polarity of the driving voltage applied to each electrode may be reduced.

The alternate operation of the first and second switch devices SW1 and SW2 and the eleventh switch device SW11 may be performed by using the clock signal CLK and the clock bar signal CLKB applied to the first and second switching circuits 190a and 190b.

As another example of the present disclosure, one of the clock signal CLK and the clock bar signal CLKB may be applied to the first and second switching circuits 190a and 190b, and the switch devices included in the first switching circuit 190a may be designed to be different from the switch devices included in the second switching circuit 190b.

Figure 20:
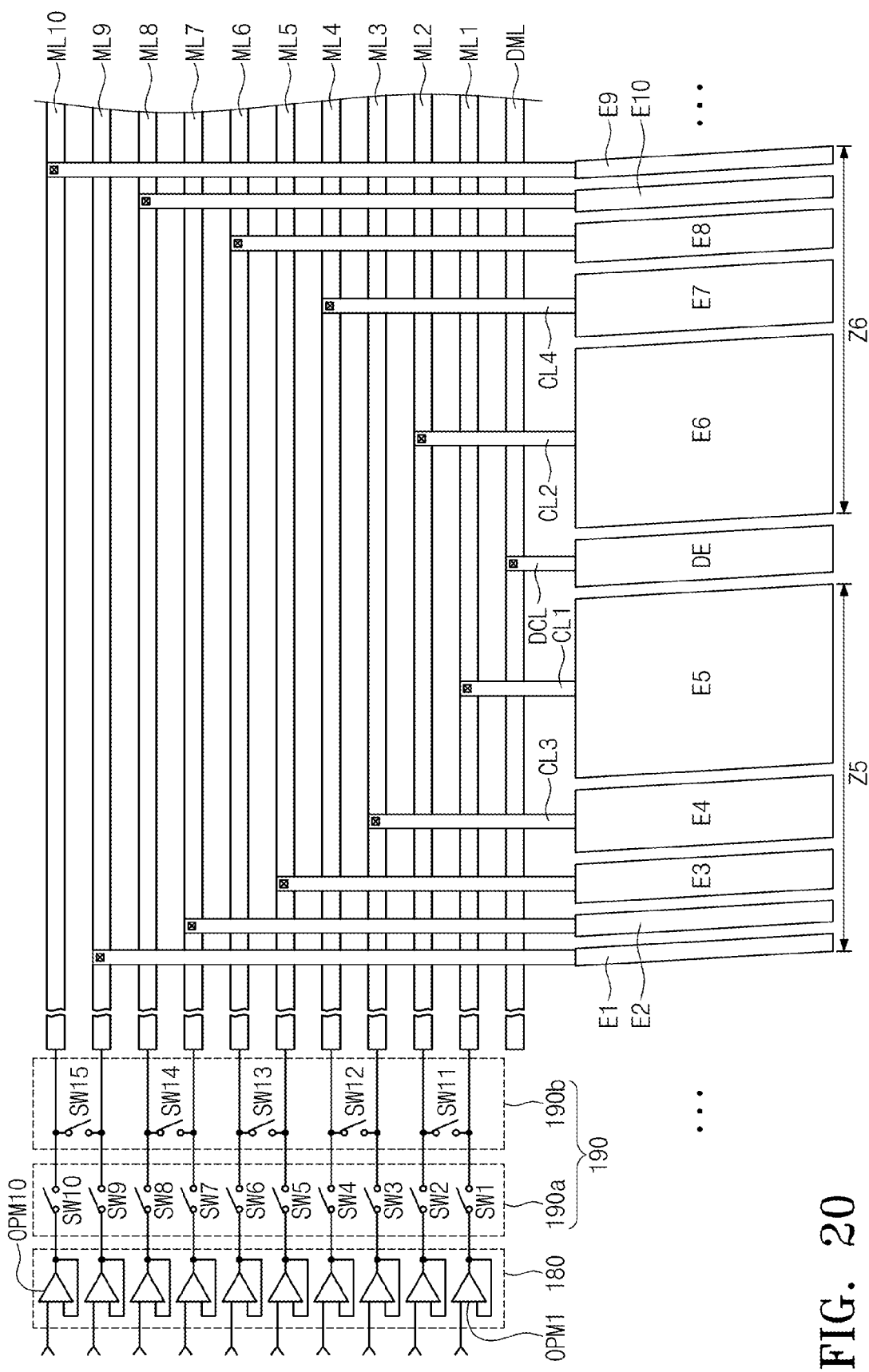
FIG. 20 is a plan view showing a line structure of a peripheral area applied to the switching panel shown in FIG. 9.

FIG. 20 is a plan view showing a line structure of a peripheral area applied to the switching panel shown in FIG. 9.

Referring to FIG. 20, m main lines ML1 to MLm, m connection lines CL1 to CLm, a dummy main line DML, and a dummy connection line DCL are disposed in the peripheral area PA of the switching panel 403. In this case, the first electrode layer 412 (refer to FIG. 9) of each of the first and second unit devices U1 and U2 includes m electrodes and a dummy electrode DE. For the convenience of explanation, FIG. 20 shows only ten electrodes.

The dummy main line DML extends substantially in parallel to the main lines ML1 to MLm and is disposed between the first main line ML1 among the main lines ML1 to MLm and the lens area LA. The dummy main line DML is applied with a dummy voltage DV having the same electric potential as that of the common voltage Vcom (refer to FIG. 10) or a small difference with respect to the common voltage Vcom. Since the difference in electric potential between the dummy voltage DV and the common voltage Vcom is smaller than the difference in electric potential between the dummy voltage DV and the driving voltage, a width of the dummy main line DML is smaller than the width of each of the main lines ML1 to MLm or smaller than the width of the first main line ML1.

The dummy connection line DCL extends substantially in parallel to the connection lines CL1 to CLm to electrically connect the dummy main line DML and the dummy electrode DE.

The first to tenth electrodes E1 to E10 are disposed in the fifth and sixth zones Z5 and Z6 of the lens area LA. The dummy zone DZ is disposed between the fifth and sixth zones Z5 and Z6 and the dummy electrode DE is disposed in the dummy zone DZ.

The dummy electrode DE receives the dummy voltage DV provided through the dummy main line DML and the dummy connection line DCL. The dummy voltage DV may be the voltage output from the dummy output buffer (not shown) included in the second driver 180 or the voltage provided from a common voltage line (not shown) that applies the common voltage Vcom (refer to FIG. 10) to the second electrode layer 422 (refer to FIG. 9).

Figure 21:
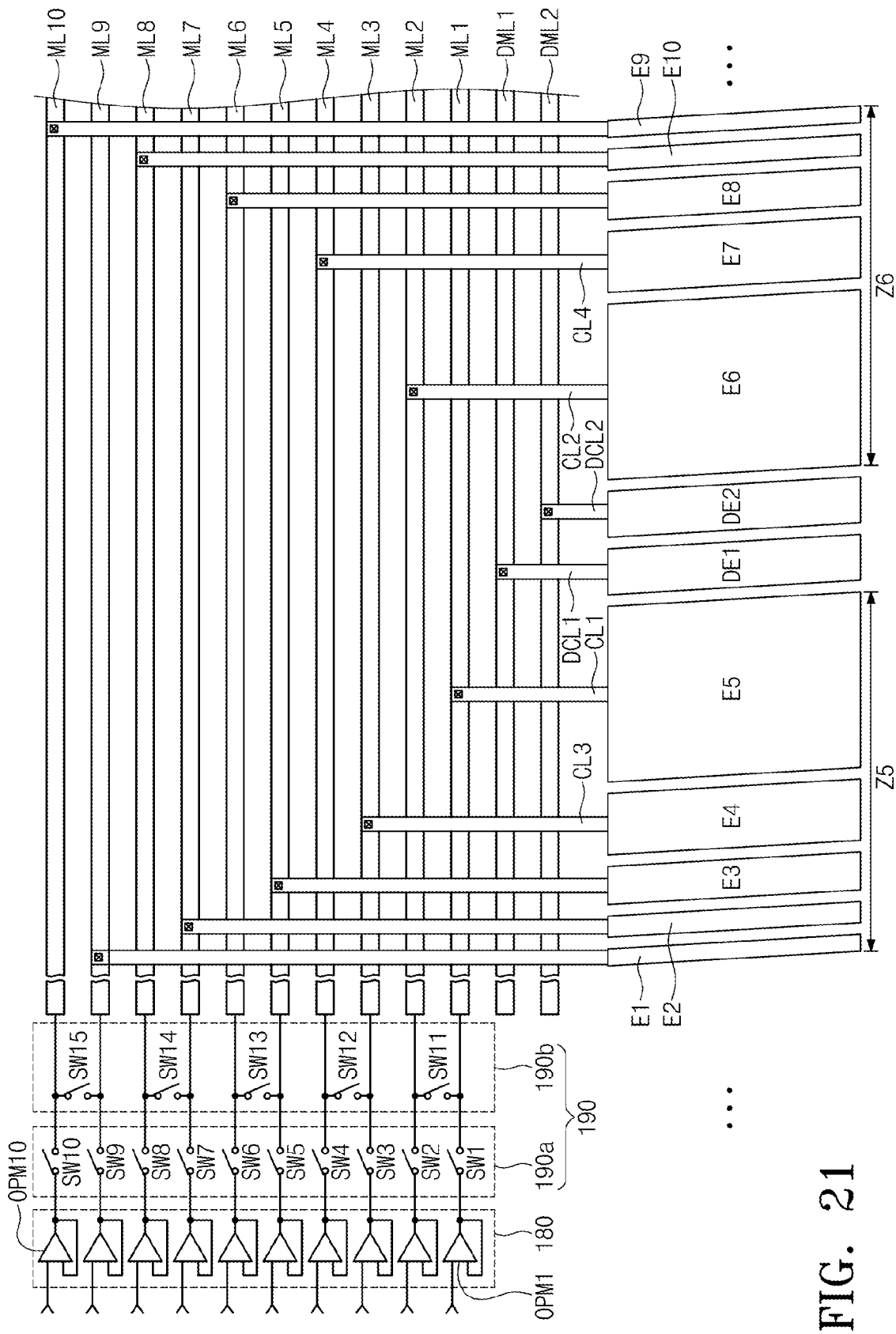
FIG. 21 is a plan view showing a line structure of a peripheral area applied to the switching panel shown in FIG. 11.

FIG. 21 is a plan view showing a line structure of a peripheral area applied to the switching panel shown in FIG. 11.

Referring to FIG. 21, m main lines ML1 to MLm, m connection lines CL1 to CLm, first and second dummy main lines DML1 and DML2, and first and second dummy connection lines DCL1 and DCL2 are disposed in the peripheral area PA of the switching panel 450. In this case, the first electrode layer 412 (refer to FIG. 11) of each of the first and second unit devices U1 and U2 includes m electrodes and first and second dummy electrodes DE1 and DE2. For the convenience of explanation, FIG. 21 shows only ten electrodes.

The first and second dummy main lines DML1 and DML2 extend substantially in parallel to the main lines ML1 to MLm and are disposed between the first main line ML1 among the main lines ML1 to MLm and the lens area LA.

The first and second dummy main lines DML1 and DML2 are applied with first and second dummy voltages DV1 and DV2 (refer to FIG. 12) each having a small difference with respect to the common voltage Vcom. As an example, the first and second dummy voltages DV1 and DV2 have the difference polarities from each other with respect to the common voltage Vcom. Since the difference in electric potential between the common voltage Vcom and the first and second dummy voltages DV1 and DV2 is smaller than the difference in electric potential between the dummy voltage DV and the driving voltage, a width of each of the first and second dummy main lines DML1 and DML2 is smaller than the width of each of the main lines ML1 to MLm or smaller than the width of the first main line ML1. The first and second dummy connection lines DCL1 and DCL2 extend substantially in parallel to the connection lines CL1 to CLm. In addition, the first and second dummy connection lines DCL1 and DCL2 electrically connect the first and second dummy main lines DML1 and DML2 and the first and second dummy electrodes DE1 and DE2, respectively.

The first to tenth electrodes E1 to E10 are disposed in the fifth and sixth zones Z5 and Z6 of the lens area LA. The first and second dummy zones DZ1 and DZ2 are disposed between the fifth and sixth zones Z5 and Z6, and the first and second dummy electrodes DE1 and DE2 are respectively disposed in the first and second dummy zones DZ1 and DZ2.

The first dummy electrode DE1 is applied with the first dummy voltage DV1 provided through the first dummy main line DML1 and the first dummy connection line DCL1 and the second dummy electrode DE2 is applied with the second dummy voltage DV2 provided through the second dummy main line DML2 and the second dummy connection line DCL2.

The first and second dummy main lines DML1 and DML2 may be electrically connected to each other and the same electric potential as that of the common voltage Vcom may be applied to the first and second dummy main lines DML1 and DML2.

The first and second dummy voltages DV1 and DV2 may be the voltage output from the dummy output buffer (not shown) included in the second driver 180 or the voltage provided from the common voltage line (not shown) that applies the common voltage Vcom (refer to FIG. 10) to the second electrode layer 422 (refer to FIG. 9).

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An image display apparatus comprising:
a display panel that displays an image; and
a switching panel operated in a two-dimensional mode or three-dimensional mode such that the image is perceived as a two-dimensional image or three-dimensional image on the display panel,
wherein the switching panel comprises a plurality of unit devices, each of the unit devices comprising a first zone disposed at one side of a center axis of the unit device and a second zone disposed at the other side of the center axis,
wherein each of the first zone and the second zone includes a plurality of electrodes, wherein the plurality of electrodes do not overlap the center axis, and wherein a pair of electrodes in the first zone and the second zone which meet each other when folded along the center axis are configured to have a same voltage but opposite polarities with respect to a common voltage.

2. The image display apparatus of claim 1, wherein the plurality of electrodes share a line of symmetry and the center axis is a line of symmetry.

3. The image display apparatus of claim 1, wherein the switching panel further comprises at least one dummy electrode disposed between the first zone and the second zone.

4. The image display apparatus of claim 3, wherein the dummy electrode comprises a first dummy electrode and a second dummy electrode, and the first and second dummy electrodes share a line of symmetry.

5. The image display apparatus of claim 3, wherein the dummy electrode has a width smaller than a maximum electrode width of the plurality of electrodes in the first zone and the plurality of electrodes in the second zone.

6. The image display apparatus of claim 3, wherein an absolute value of a voltage difference between a dummy voltage applied to the dummy electrode and the common voltage is smaller than that between the driving voltage applied to the plurality of electrodes and the common voltage.

7. The image display apparatus of claim 3, wherein the dummy electrode is applied with the common voltage.

8. The image display apparatus of claim 3, wherein the switching panel further comprises a first plurality of main lines configured to apply driving voltages to the first zone and a second plurality of main lines configured to apply driving voltages to the second zone, and wherein a pair of main lines are configured to apply a same voltage but opposite polarities with respect to a common voltage.

9. The image display apparatus of claim 8, further comprising a sharing circuit, the sharing circuit being configured to electrically connect the pair of main lines.

10. The image display apparatus of claim 2, wherein the switching panel further comprises at least one dummy electrode disposed between the first zone and the second zone.

11. The image display apparatus of claim 10, wherein the switching panel further comprises a first plurality of main lines configured to apply driving voltages to the first zone and a second plurality of main lines configured to apply driving voltages to the second zone, and wherein a pair of main lines are configured to apply a same voltage but opposite polarities with respect to a common voltage.

12. The image display apparatus of claim 2, wherein the switching panel further comprises a first plurality of main lines configured to apply driving voltages to the first zone and a second plurality of main lines configured to apply driving voltages to the second zone, and wherein a pair of main lines are configured to apply a same voltage but opposite polarities with respect to a common voltage.

13. An image display apparatus comprising:

a display panel that displays an image; and a switching panel operated in a two-dimensional mode or three-dimensional mode such that the image is perceived as a two-dimensional image or three-dimensional image on the display panel, wherein the switching panel comprises a plurality of unit devices, each of the unit devices comprising a first zone disposed at one side of a center axis of the unit device and a second zone disposed at the other side of the center axis, wherein each of the first zone and the second zone includes a plurality of electrodes, wherein the plurality of electrodes do not overlap the center axis, and wherein the switching panel further comprises at least one dummy electrode disposed between the first zone and the second zone.

14. The image display apparatus of claim 13, wherein the switching panel further comprises a first plurality of main lines configured to apply driving voltages to the first zone and a second plurality of main lines configured to apply driving voltages to the second zone, and wherein a pair of main lines are configured to apply a same voltage but opposite polarities with respect to a common voltage.

15. An image display apparatus comprising:

a display panel that displays an image; and a switching panel operated in a two-dimensional mode or three-dimensional mode such that the image is perceived as a two-dimensional image or three-dimensional image on the display panel, wherein the switching panel comprises a plurality of unit devices, each of the unit devices comprising a first zone disposed at one side of a center axis of the unit device and a second zone disposed at the other side of the center axis, wherein each of the first zone and the second zone includes a plurality of electrodes, wherein the plurality of electrodes do not overlap the center axis, wherein the switching panel further comprises a first plurality of main lines configured to apply driving voltages to the first zone and a second plurality of main lines configured to apply driving voltages to the second zone, and wherein a pair of main lines are configured to apply a same voltage but opposite polarities with respect to a common voltage.

* * * * *